(12) United States Patent
Nagayama

(10) Patent No.: US 7,465,136 B2
(45) Date of Patent: Dec. 16, 2008

(54) INSERT NUT AND INSERT T-NUT

(75) Inventor: Yutaka Nagayama, Kishiwada (JP)

(73) Assignee: Nigayama Electric Co., Ltd., Kishiwada-shi (JP)

( * ) Notice: Subject to any disclaimer, the term of this patent is extended or adjusted under 35 U.S.C. 154(b) by 65 days.

(21) Appl. No.: 11/456,609

(22) Filed: Jul. 11, 2006

(65) Prior Publication Data

US 2007/0009341 A1    Jan. 11, 2007

(30) Foreign Application Priority Data

Jul. 11, 2005    (JP) ............................. 2005-201206

(51) Int. Cl.
  *F16B 37/02*  (2006.01)
  *F16B 37/12*  (2006.01)

(52) U.S. Cl. ........................ 411/178; 411/432; 411/903

(58) Field of Classification Search ......... 411/178–181, 411/432, 903, 61; 470/23, 25
See application file for complete search history.

(56) References Cited

U.S. PATENT DOCUMENTS

| | | | | |
|---|---|---|---|---|
| 1,080,332 | A | * | 12/1913 | Dodds .......................... 411/260 |
| 1,227,627 | A | * | 5/1917 | Kennedy ..................... 411/178 |
| 2,549,393 | A | * | 4/1951 | Siesel ........................... 411/419 |
| 2,718,485 | A | * | 9/1955 | Samuely ........................ 216/35 |
| 3,039,641 | A | * | 6/1962 | Rosan ........................... 217/113 |
| 3,687,181 | A | | 8/1972 | Coyle |
| 4,490,083 | A | * | 12/1984 | Rebish ......................... 411/338 |
| 4,655,660 | A | * | 4/1987 | McGlone et al. .......... 411/366.2 |
| 5,195,854 | A | | 3/1993 | Nagayama |
| 5,238,344 | A | | 8/1993 | Nagayama |
| 5,348,432 | A | | 9/1994 | Nagayama |
| 5,429,466 | A | | 7/1995 | Nagayama |
| 5,503,596 | A | | 4/1996 | Nagayama |
| 5,823,729 | A | | 10/1998 | Nagayama |
| 5,908,664 | A | | 6/1999 | Nagayama |
| 6,019,557 | A | * | 2/2000 | Lo et al. ...................... 411/176 |
| 6,109,849 | A | | 8/2000 | Nagayama |
| 6,139,237 | A | | 10/2000 | Nagayama |
| 6,439,818 | B1 | | 8/2002 | Nagayama |
| 6,511,274 | B1 | | 1/2003 | Nagayama |

FOREIGN PATENT DOCUMENTS

EP    1375933    1/2004

(Continued)

*Primary Examiner*—Flemming Saether
(74) *Attorney, Agent, or Firm*—Westerman, Hattori, Daniels & Adrian, LLP.

(57) ABSTRACT

There is provided an insert nut, wherein a dies is pressed on one surface of a predetermined metal plate 7 to form a screw portion 8, so as to form a patterned portion 9 on the other surface of the metal plate by forming the screw portion, wherein the metal plate 7 is wound such that the screw portion 8 to become a female screw 2 is located inside so as to form a cylindrical form, and then the opposite edges 7a, 7b of the wound metal plate are connected together to form a cylindrical shank portion 3, wherein the outside surface of the exposed patterned portion of the shank 3 is covered with a resin layer 6 such that projections 5 of a synthesis resin is formed at the outside thereof.

8 Claims, 36 Drawing Sheets

FOREIGN PATENT DOCUMENTS

| | | |
|---|---|---|
| FR | 2707535 A | 1/1995 |
| JP | 895346 | 4/1994 |
| JP | 895348 | 4/1994 |
| JP | 6-143033 A | 5/1994 |
| JP | 908545 | 10/1994 |
| JP | 8-6739 | 1/1996 |
| JP | 2517493 | 4/1996 |
| JP | 2517494 | 4/1996 |
| JP | 2547171 | 8/1996 |
| JP | 2597288 | 1/1997 |
| JP | 2613166 | 2/1997 |
| JP | 2676181 | 7/1997 |
| JP | 1017904 | 8/1998 |
| JP | 2839472 | 10/1998 |
| JP | 2940898 | 6/1999 |
| JP | 3310879 | 5/2002 |
| JP | 3310928 | 5/2002 |
| JP | 3310934 | 5/2002 |
| JP | 3310939 | 5/2002 |
| JP | 3313097 | 5/2002 |
| JP | 3398298 | 2/2003 |
| JP | 2004-211778 A | 7/2004 |

* cited by examiner (a)                              (b)

FIG. 6
(a)
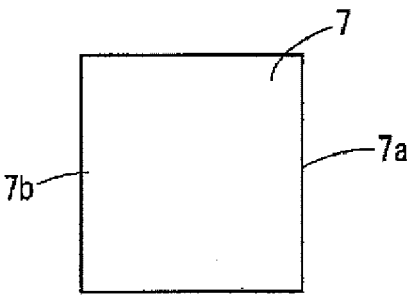
(b)
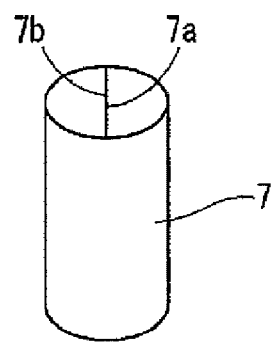
(c)
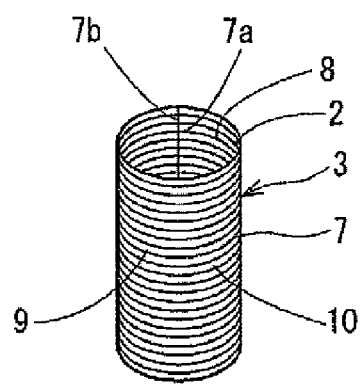
(d)
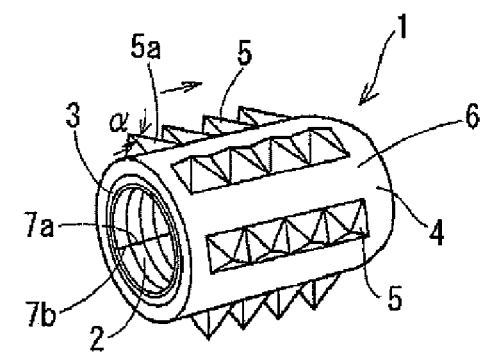

FIG. 10
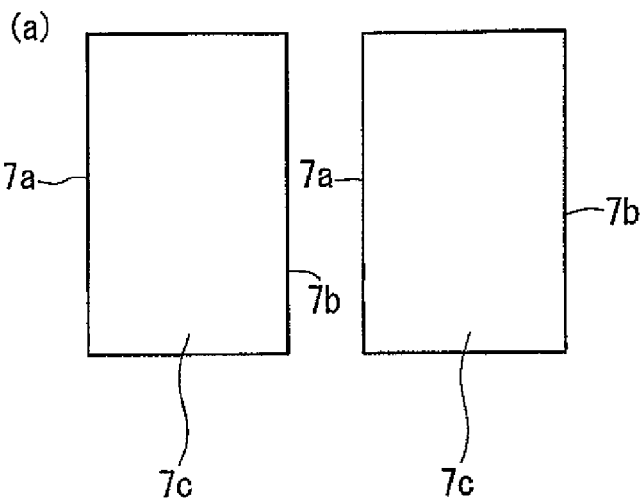
(a)
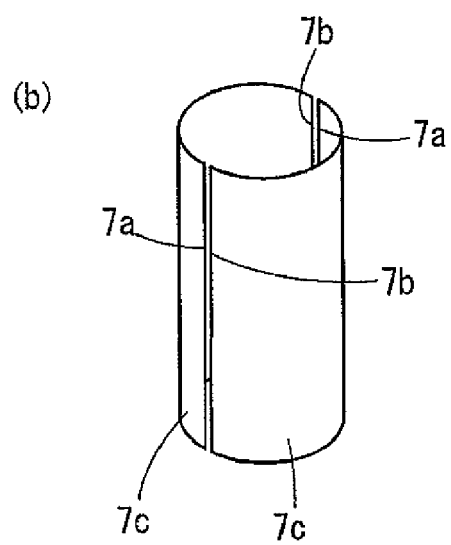
(b)
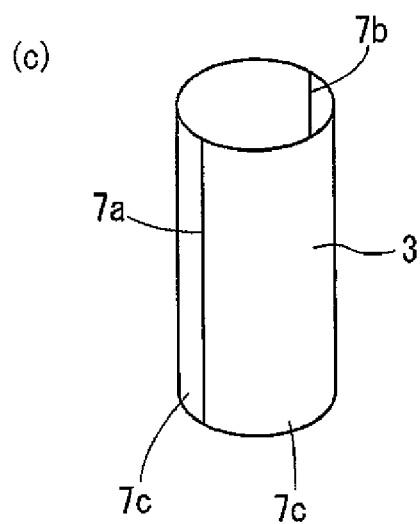
(c)

FIG. 11
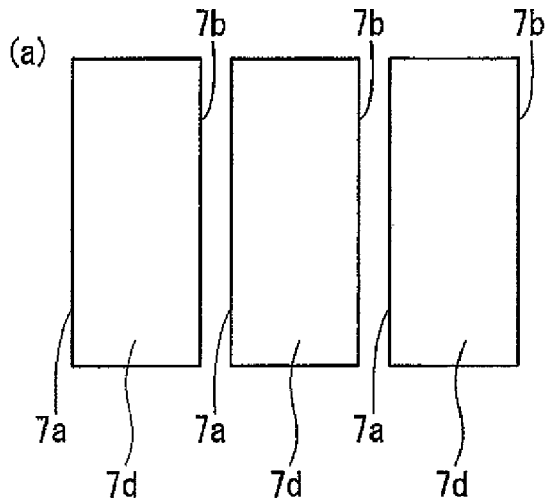
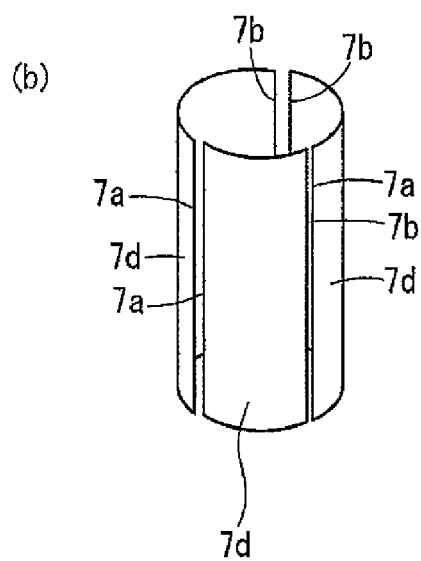
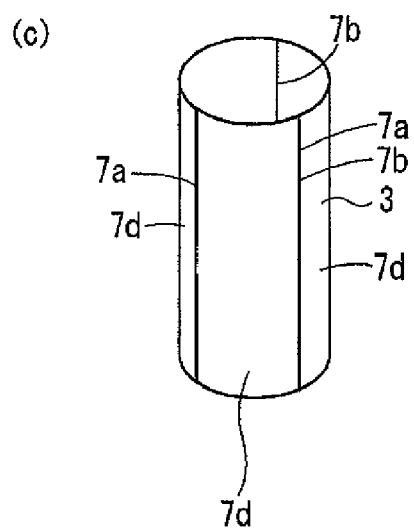

(a)                    (b)

(a)                    (b)

FIG. 18
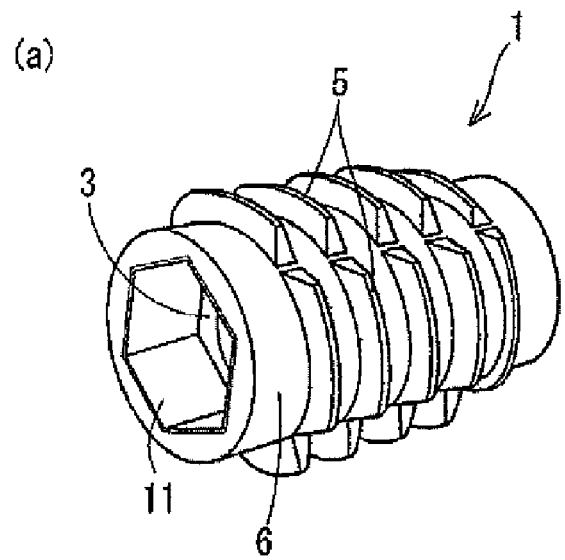
(a)
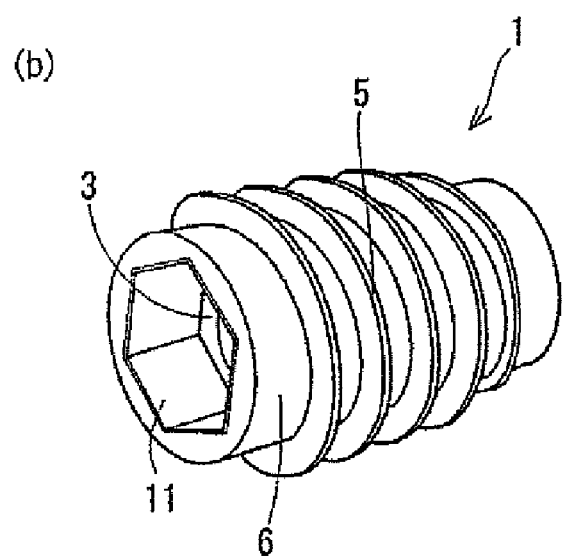
(b)
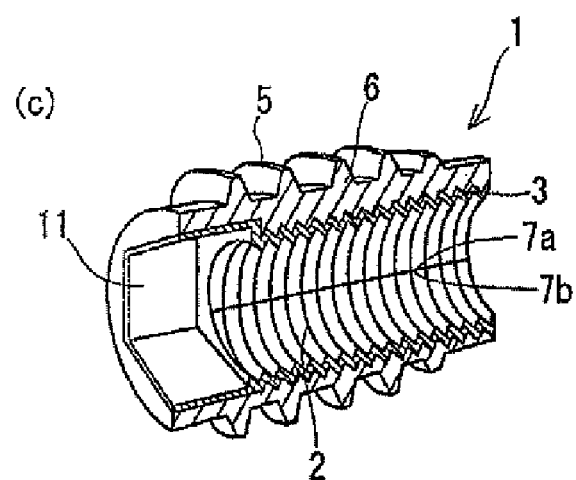
(c)

FIG. 19
(a) 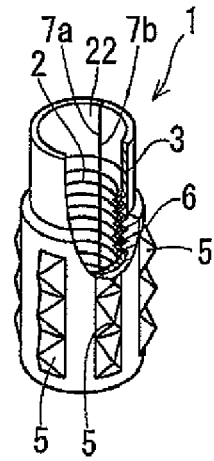
(b) 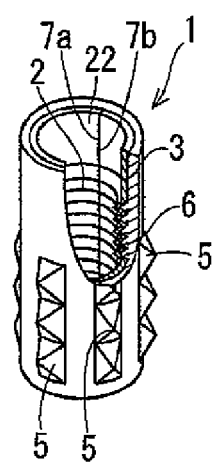
(c) 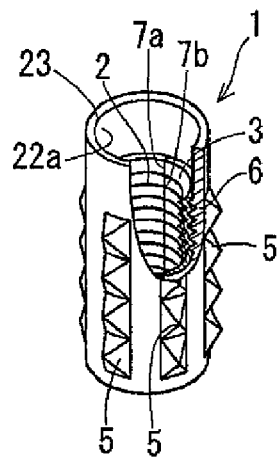

FIG. 21
(a) 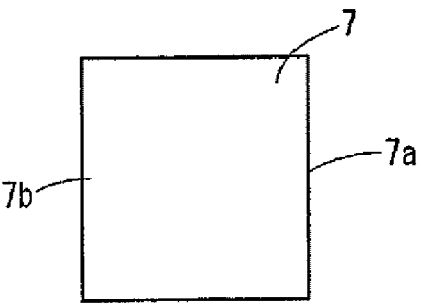
(b) 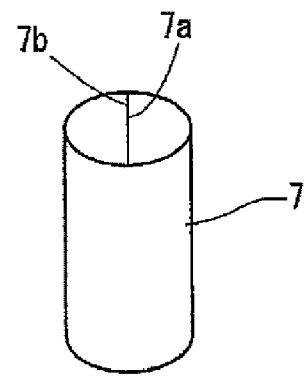
(c) 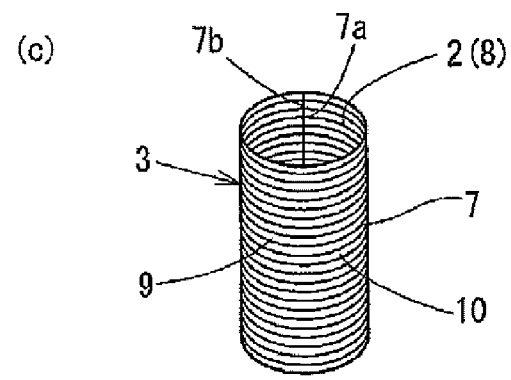
(d) 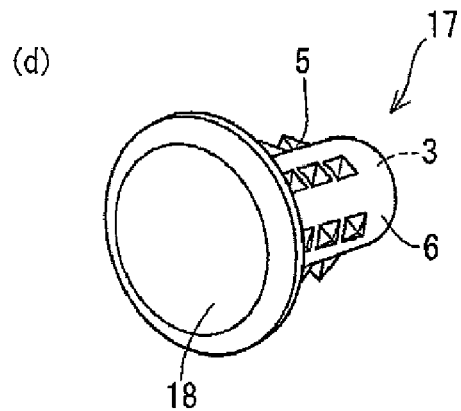

FIG. 22
(a)
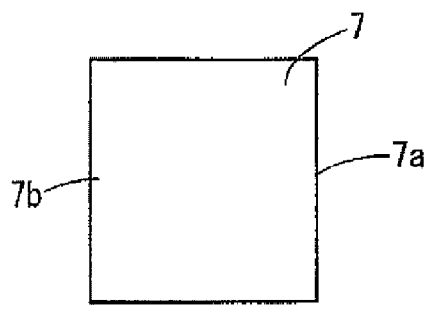
(b)
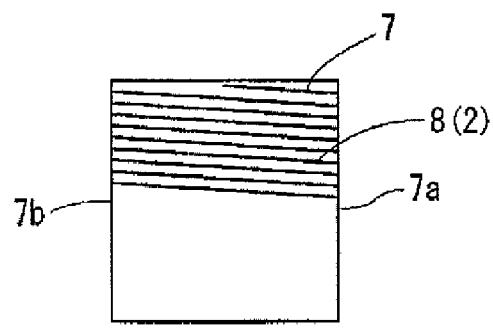
(c)
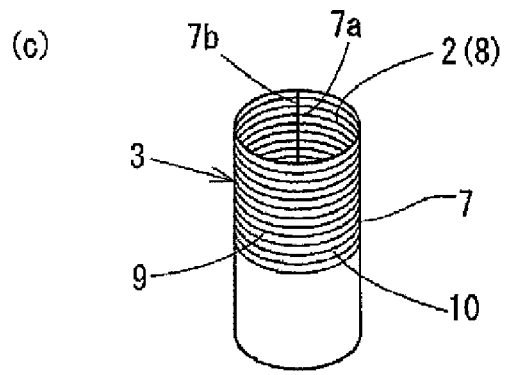
(d)
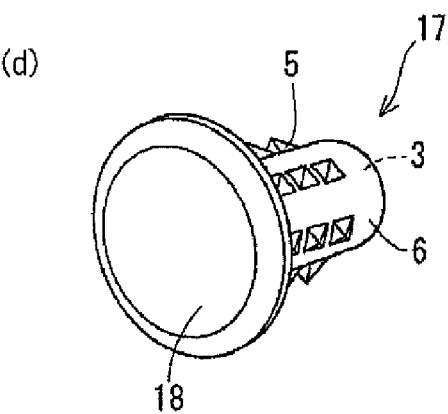

FIG. 25
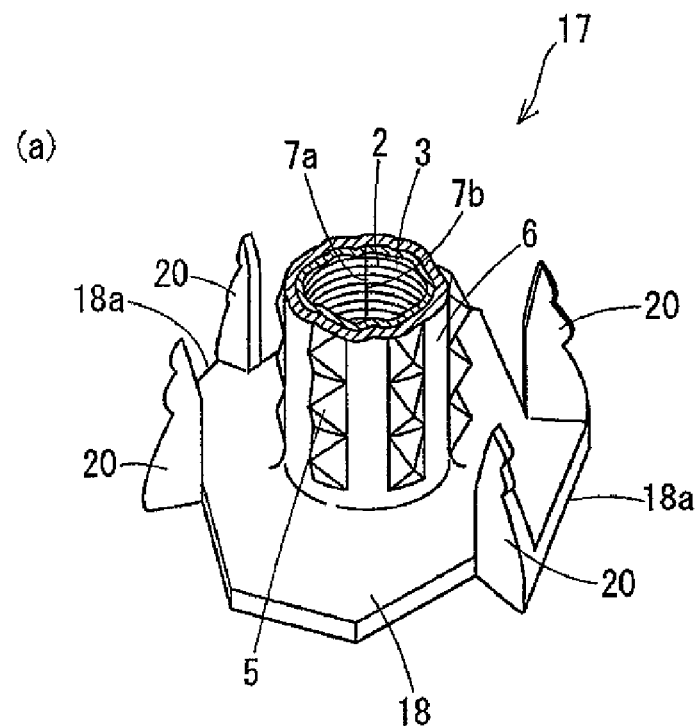
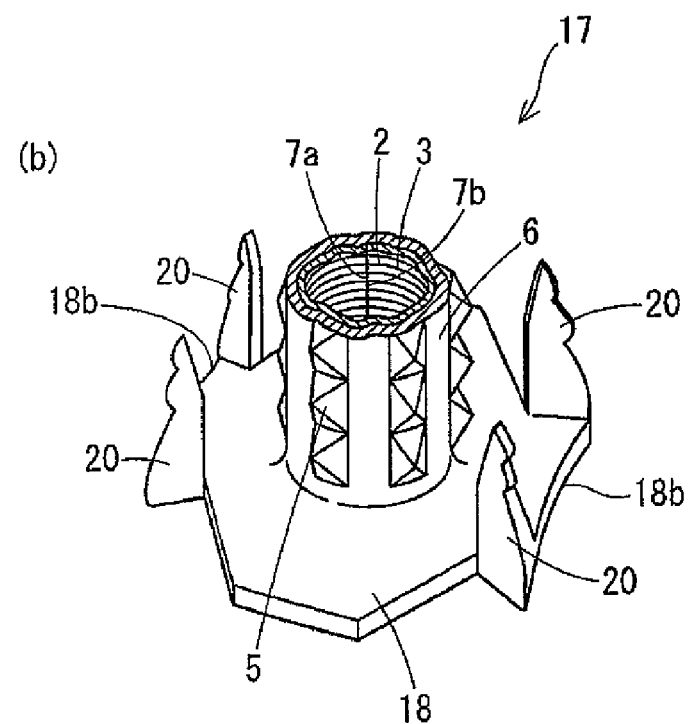

FIG. 31
(a)
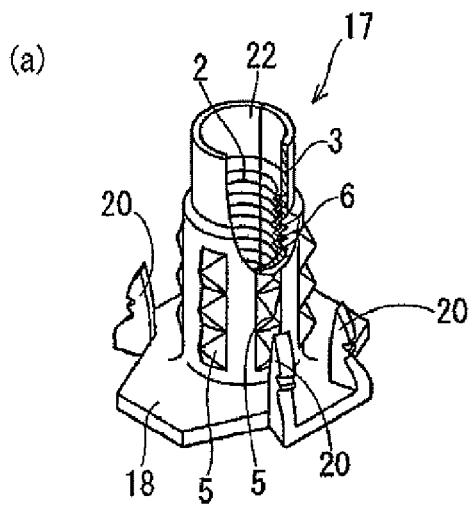
(b)
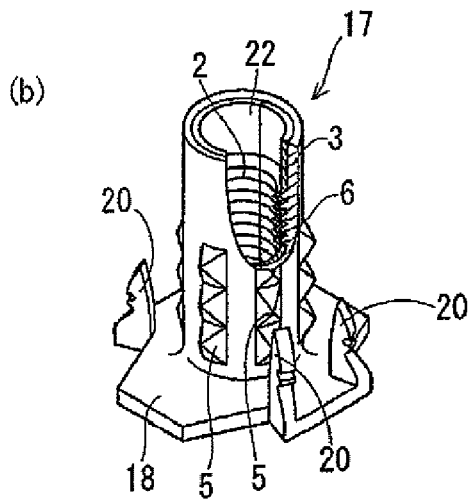
(c)
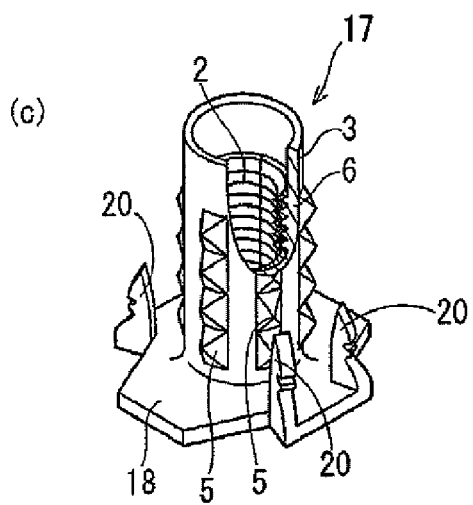

FIG. 32
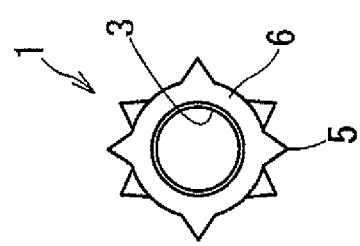
(a)
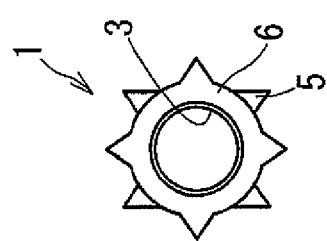
(b)
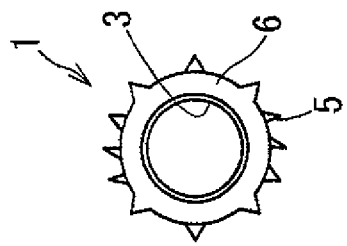
(c)
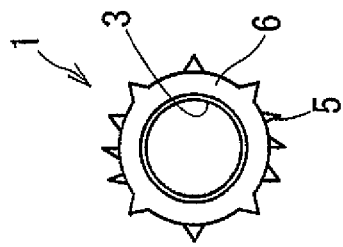
(d)
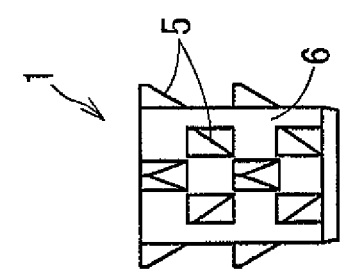
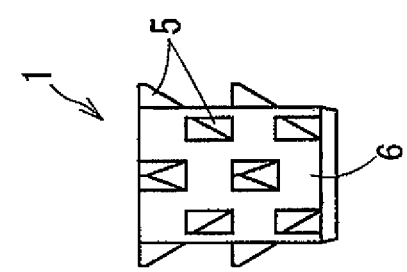
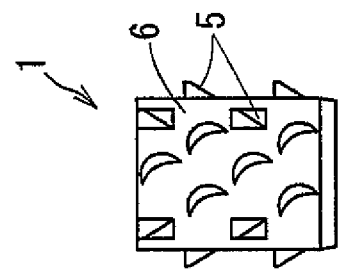
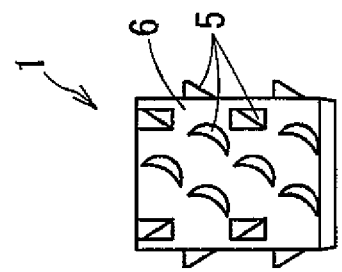

FIG. 33
(a) 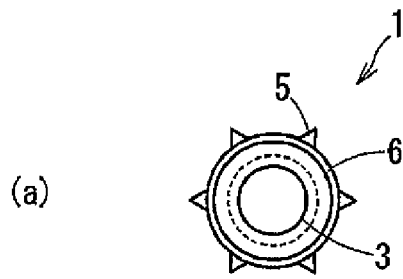
(b) 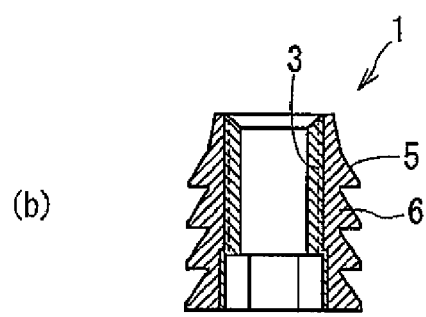
(c) 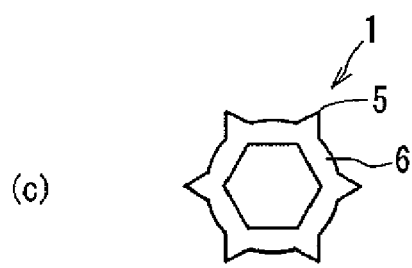
(d) 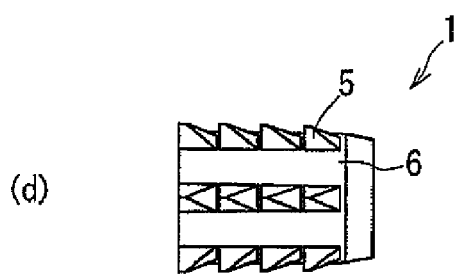

FIG. 34
(a) 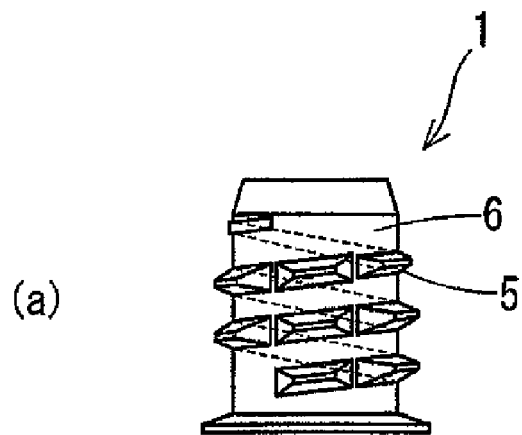
(b) 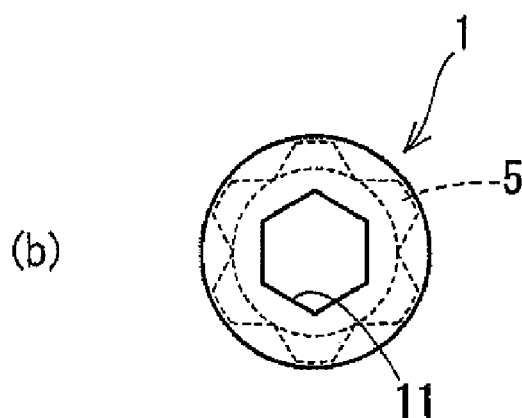
(c) 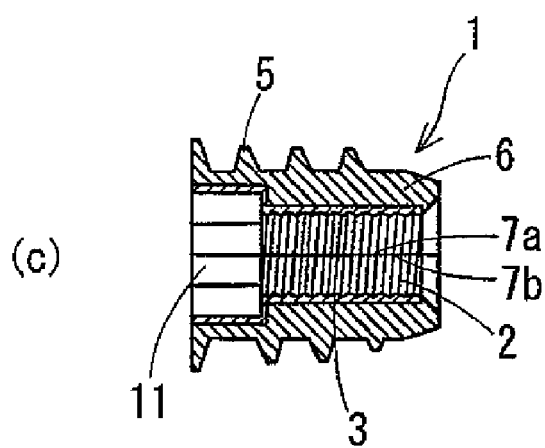

FIG. 35
(a) 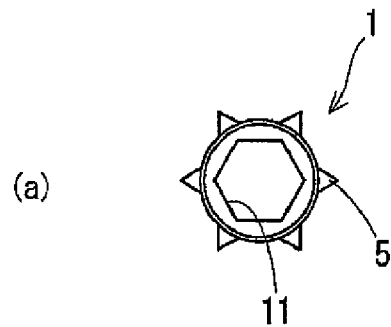
(b) 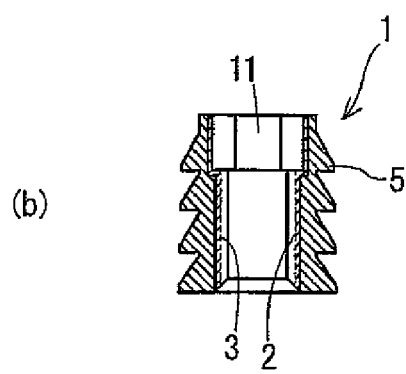
(c) 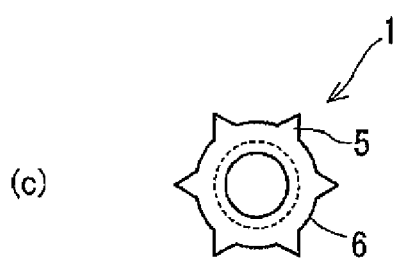
(d) 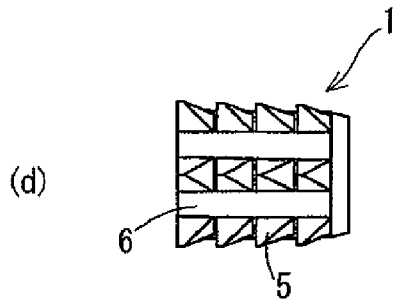

FIG. 36
(a) 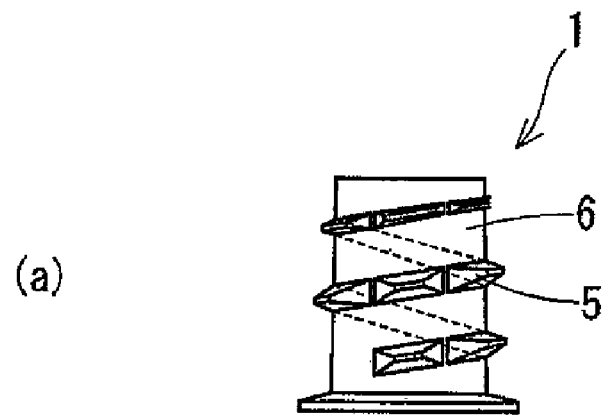
(b) 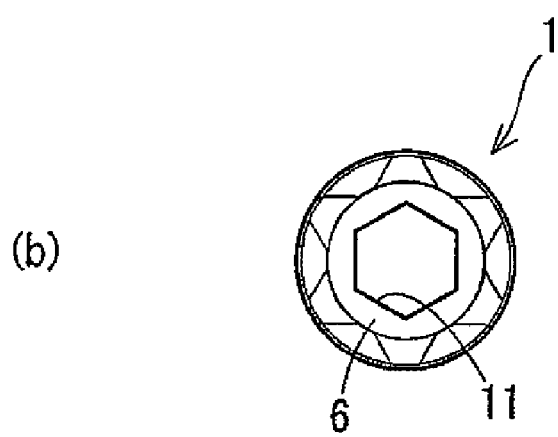
(c) 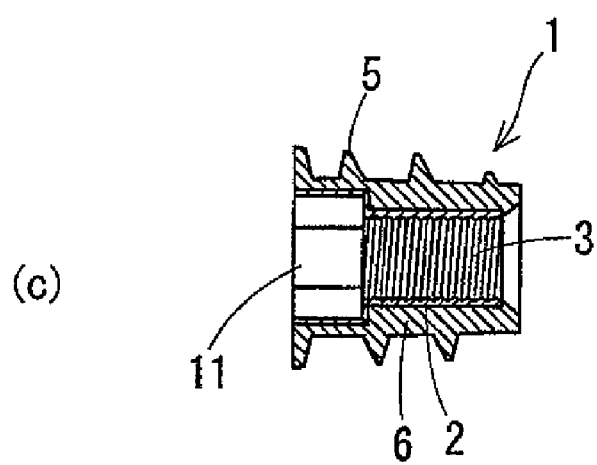

(a)

(b)

FIG. 40
(a) 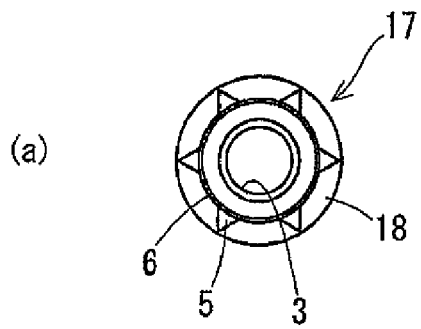
(b) 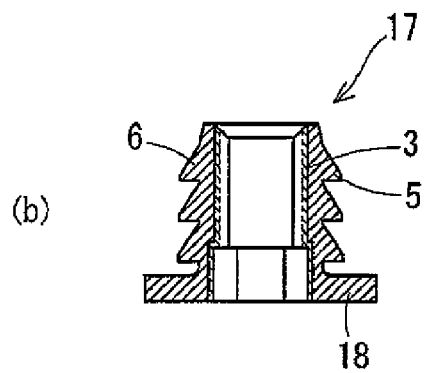
(c) 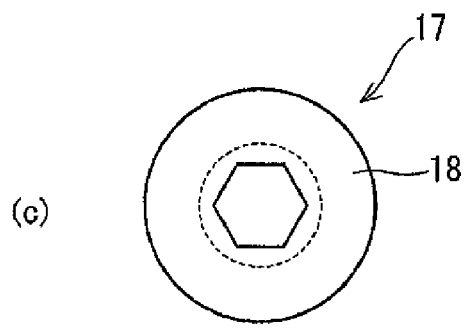
(d) 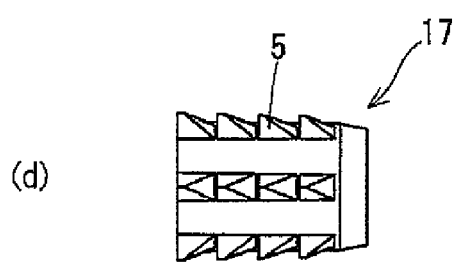

FIG. 41
(a) 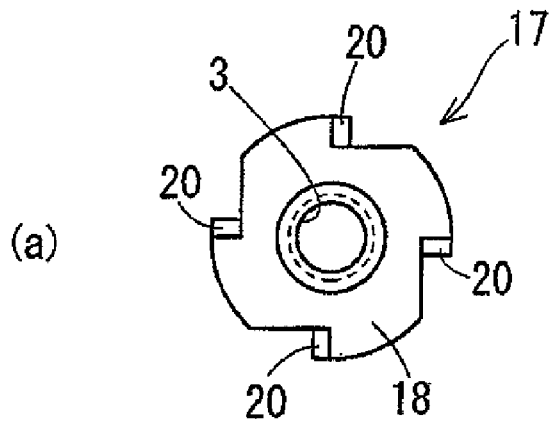
(b) 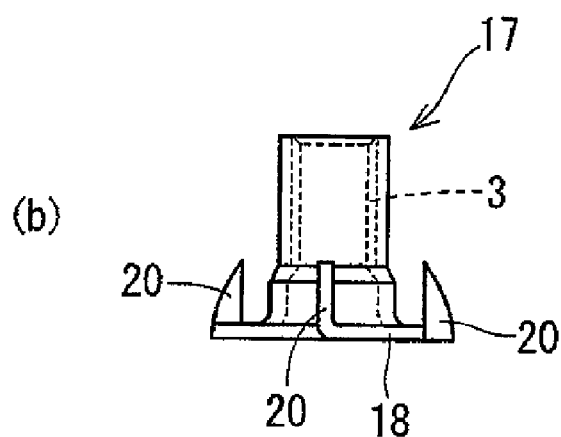
(c) 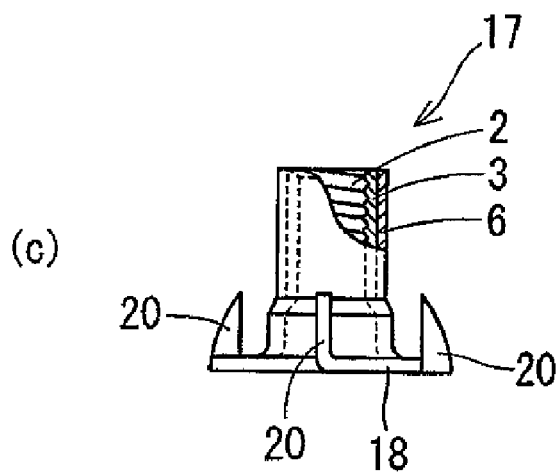

FIG. 44
(a)
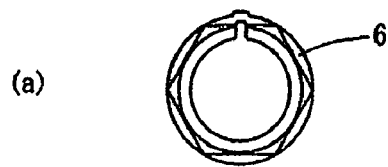
(b)
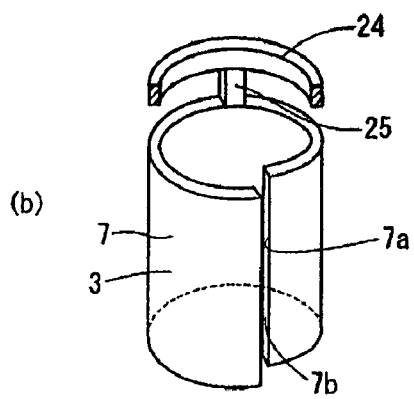
FIG. 45
Prior Art
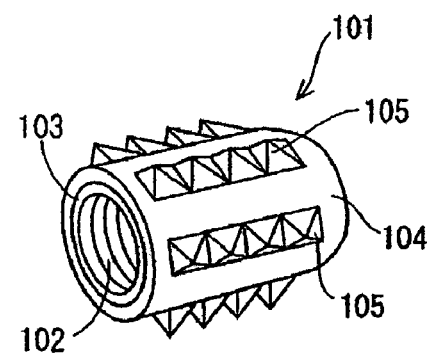
FIG. 46
Prior Art
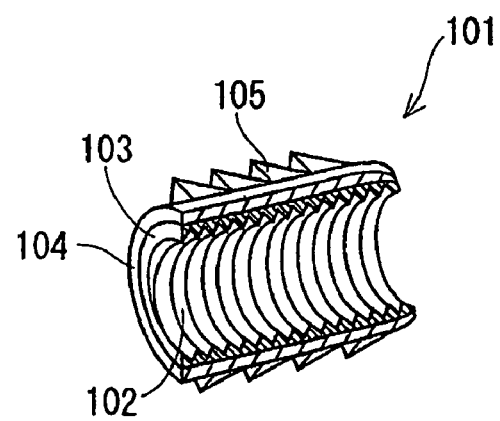

INSERT NUT AND INSERT T-NUT

TECHNICAL FIELD

The present invention relates to an insert nut and an insert t-nut, which can be used for fixing materials one to another, and in particular, which can be used for fixing a table board to a table leg by using volts and screws.

BACKGROUND OF THE INVENTION

First of all, conventional insert nut and insert t-nut are briefly explained, which were developed by the same inventor as the present invention, as disclosed in JP laid open patent publication No. 2004-211778. A conventional insert nut 101, as illustrated in FIG. 45 and FIG. 46, has prepared as follows: A metal material is formed into a cylindrical shape having a predetermined length. Then, the internal surface is subjected to a screwing process to form a female screw 102. That becomes a shank portion 103 which is in the form of hallow with a female screw 102 thereinside. Further, the outside surface of the shank 103 (the whole of the outside surface) is covered with a synthesis resin to form a resin layer 104. The outside surface of the resin layer 104 is provided with projections 105 continuously patterned.

Also, another conventional insert nut 106, as shown in FIG. 47 and FIG. 48, is described, which has a shank 103 similar to the example as explained above, having a female screw 102. The outside of the shank 103 is provided with a resin layer 104 made of a synthesis resin, forming projections 105. Also, a flange 107 is formed integrally with the resin layer 104 by a synthetic resin. At the center of the flange 107 made of a synthesis resin, a hexagonal hole 108 is provided for engaging with a hexagonal wrench.

Also, a conventional insert nut as shown in FIGS. 49 and 50 has a shank having a structure similar to the insert nut 101 (106) as explained above, and a flange 110 integrally formed with the shank by using a metal material. The flange is extended outwardly from one end of the shank 103. The outside surface of the flange 110 and the shank 103 is covered with a resin layer 104. The outside surface of the resin layer 104 has projections 105 formed.

OBJECTIVES OF THE INVENTION

However, in the conventional insert nuts 101, 106 or insert t-nut 109, the shank is formed into a cylindrical shape by using a metal material, which is then subjected to a screwing process at the inside surface thereof so as to form a female screw 102. Thus, the metal material was necessary to be enough in thickness. In other words, a thin metal material cannot be used, thus resulting in raising the production cost. Also, the female screw 102 of the shank 103 is formed through a screwing process, which generates metal chips. Thus, it is necessary to consider how it should be treated.

Also, the outside surface of the shank 103, which is covered with a resin layer 104, is smooth. Thus, after the insert nut 101, 106 or insert t-nut 109 is inserted into a hole formed on a table board material, and when the table board material is tried to fix it to a leg material by using volts or screws, the shank 103 can be turned separately from the resin layer 104 especially when the volt, etc. is strongly screwed against the female screw 102.

Also, in case of the insert nut 106 as shown in FIGS. 47 and 48 as explained above, the flange 107, having formed a hexagonal hole 108, is formed of a synthesis resin. Thus, when a hexagonal wrench is engaged with the hexagonal hole 108, the peripheral portion of the hexagonal hole 108 can be broken. Therefore, in the conventional production of the insert nut 106, a recycled synthesis resin cannot be used in view of the strength. New synthesis resins have to be used, thus resulting in raising the production cost.

The present invention has been accomplished in view of the above, and its purpose is to provide an insert nut and an insert t-nut in which a cylindrical shank having a female screw is prepared not through screwing process but with using a thinner metal material than ones used in the prior art, resulting in reducing the production cost. Also, the purpose is to provide an insert nut and an insert t-nut in which the portion of the synthesis resin working with a tool such as a hexagonal wrench is unlikely to be broken. Also, the purpose is to provide an insert nut and an insert t-nut in which a volt, etc., can be screwed into the female screw of the shank without the shank so as not to turn the resin layer formed on the shank separately.

SUMMARY OF THE INVENTION

In order to achieve the aforementioned objectives, the present invention comprises as follows: That is, the insert nut of the first aspect of the present invention is that a dies is pressed on one surface of a predetermined metal plate to form a screw portion, so as to form a patterned portion on the other surface of the metal plate by forming the screw portion. The metal plate is wound such that the screw portion, which becomes a female screw, is located inside so as to form a cylindrical form. Then, the opposite edges of the wound metal plate are connected together to form a cylindrical shank portion. The outside surface of the exposed patterned portion of the shank is covered with a resin layer such that projections of a synthesis resin is formed at the outside thereof.

The insert nut of the second aspect of the present invention is that a predetermined metal plate is cylindrically wound, and the opposite edges are connected together to form a cylindrical shank. A dies is pressed on the inside and outside surfaces to form a screw portion. The screw portion to become a female portion should be inside. By the forming of the screw portion, a patterned portion is formed on the outside of the shank. The outside surface of the exposed patterned portion of the shank is covered with a resin layer such that projections of a synthesis resin is formed at the outside thereof.

The insert nut of the third aspect is that a dies is pressed on a portion of one surface of a predetermined metal plate to form a screw portion to become a female screw, so as to form a patterned portion on the other surface of the metal plate by forming the screw portion, wherein the metal plate is wound such that the screw portion is located inside so as to form a cylindrical form, and the opposite edges of the wound metal plate are connected together to form a cylindrical shank portion, wherein the outside surface of the exposed patterned portion of the shank is covered with a resin layer such that a projections of a synthesis resin is formed at the outside thereof.

The insert nut of the fourth aspect is that a dies is pressed on one surface of a predetermined metal plate to form a screw portion to become a female screw except a portion having a predetermined width at the upper portion of the metal plate, so as to form a patterned portion on the other surface of the metal plate by forming the screw portion, wherein the metal plate is wound such that the screw portion to become a female portion is located inside so as to form a cylindrical form at the screw portion, wherein the portion without the screw portion at the upper portion of the metal plate is formed into a polygonal shape, wherein the opposite edges of the wound metal plate are connected together to form a cylindrical shank portion with the polygonal portion at the upper portion thereof, wherein the outside surface of the exposed patterned portion of the shank is covered with a resin layer such that projections of a synthesis resin is formed at the outside thereof, and wherein the outside surface of the polygonal portion is also covered with a resin layer.

The insert nut of the fifth aspect is that a dies is pressed on one surface of a predetermined metal plate to form a screw portion to become a female screw except an upper portion and a lower portion, each having a predetermined width, of the metal plate, so as to form a patterned portion on the other surface of the metal plate by forming the screw portion, wherein the metal plate is wound such that the screw portion to become a female portion is located inside so as to form a cylindrical form at the screw portion and the lower portion, wherein the portion without the screw portion at the upper portion of the metal plate is formed into a polygonal shape, wherein the opposite edges of the wound metal plate are connected together to form a cylindrical shank portion with the polygonal portion at the upper portion thereof, wherein the outside surface of the exposed patterned portion of the shank is covered with a resin layer such that projections of a synthesis resin is formed at the outside thereof, wherein the outside surface of the polygonal portion and the outside surface of the cylindrically wound lower portion having the predetermined width are also covered with the resin layer.

The insert nut of the sixth aspect is that a dies is pressed on one surface of a predetermined metal plate, at an edge of which an auxiliary metal plate portion is provided through a connecting metal plate portion, to form a screw portion, so as to form a patterned portion on the other surface of the metal plate by forming the screw portion, wherein the metal plate is wound such that the screw portion to become a female screw is located inside so as to form a cylindrical form, and such that the auxiliary metal plate portion is also wound in a cylindrical or polygonal shape, wherein the opposite edges of the wound metal plate and the auxiliary metal portion are connected together to form a cylindrical shank portion, wherein the outside surface of the exposed patterned portion of the shank and the auxiliary metal plate portion is covered with a resin layer such that a projection of a synthesis resin is formed at the outside thereof wherein the resin layer covering the outside surface of the formed female screw in the shank is pressed by a press pin from the outside of the metal plate formed into the cylindrical shape so as to avoid the synthesis resin entering from the gap of the connection of the cylindrical metal plate during the forming process, wherein several holes for inserting the press pin for correcting the gap of the connected portion and for maintaining the shape of the metal plate are provided.

The insert nut of the seventh aspect is that in any one of the first to sixth aspects, the predetermined metal plate comprises several sheets, and wherein the several sheets of the metal plates are formed into the shank.

The insert nut of the eighth aspect is that in any one of the first to seventh aspects, the opposite edges for connecting together after being wound cylindrically are formed in a line.

The insert nut of the ninth aspect is that in any one of the first to eighth aspects, the opposite edges for connecting together after being wound cylindrically are formed in a continuous or discontinuous pattern, or curved in a continuous or discontinuous wave, such that the opposite edges are engaged and connected with each other.

The insert nut of the tenth aspect is that in any one of the first to ninth aspects, the outside surface of the female screw portion of the shank has formed at least one concave portion, and by forming the concaved portion, the female screw portion is partially disordered The insert nut of the eleventh aspect is that in any one of the first to third and seventh to tenth aspects, the shank has a shape in which the diameter thereof is gradually reduced from one end to the tip portion.

The insert nut of the twelfth aspect is that in any one of the first to eleventh aspects, several pieces of the projections are formed on the outside surface of the shank at a predetermined interval in the perpendicular or circumferential direction, or in a continuous or discontinuous spiral form.

The insert nut of the thirteenth aspect is that in any one of the first to twelfth aspects, the shank has a comparatively thin portion at the tip thereof, which is to be caulked, and wherein the inside surface of the shank being cylindrical except the to-be-caulked portion has a female screw.

The insert nut of the fourteenth aspect is that in the thirteenth aspect, the outside surface of the to-be-caulked portion of the shank is also covered with the resin layer.

An insert nut of the fifteenth aspect is that in any one of the first to twelfth aspects, wherein the resin layer covering the outside surface of the shank is further integrally formed with the tube portion of a synthesis resin to become the to-be-caulked portion, which is projected from the outside surface of the tip portion of the shank.

The insert t-nut of the sixteenth aspect is that a dies is pressed on one surface of a predetermined metal plate to form a screw portion, so as to form a patterned portion on the other surface of the metal plate by forming the screw portion, wherein the metal plate is wound such that the screw portion to become a female screw is located inside so as to form a cylindrical form, and then the opposite edges of the wound metal plate are connected together to form a cylindrical shank portion, wherein the outside surface of the exposed patterned portion of the shank is covered with a resin layer such that a projection of a synthesis resin is formed at the outside thereof, wherein the shank has a flange made of a synthesis resin projecting outwardly from one tip of the shank, integrally formed with the resin layer.

The insert t-nut of the seventeenth aspect is that a predetermined metal plate is cylindrically wound, and the opposite edges are connected together to form a cylindrical shank, wherein a dies is pressed on the inside and outside surfaces to form a screw portion to be a female portion at the inside surface, wherein by the forming the screw portion, a patterned portion is formed on the outside of the shank, wherein the outside surface of the exposed patterned portion of the shank is covered with a resin layer such that a projection of a synthesis resin is formed at the outside thereof, wherein the shank has a flange made of a synthesis resin projecting outwardly from one tip of the shank, integrally formed with the resin layer.

The insert t-nut of the eighteenth aspect is that a dies is pressed on a portion of one surface of a predetermined metal plate to form a screw portion to become a female screw, so as to form a patterned portion on the other surface of the metal plate by forming the screw portion, wherein the metal plate is wound such that the screw portion is located inside so as to form a cylindrical form, and the opposite edges of the wound metal plate are connected together to form a cylindrical shank portion, wherein the outside surface of the exposed patterned portion of the shank is covered with a resin layer such that a projection of a synthesis resin is formed at the outside thereof, wherein the shank has a flange made of a synthesis resin projecting outwardly from one tip of the shank, integrally formed with the resin layer.

The insert t-nut of the nineteenth aspect is that a dies is pressed on one surface of a predetermined metal plate, at an edge of which an auxiliary metal plate portion is provided through a connecting metal plate portion, to form a screw portion, so as to form a patterned portion on the other surface of the metal plate by forming the screw portion, wherein the metal plate is wound such that the screw portion to become a female screw is located inside so as to form a cylindrical form, and such that the auxiliary metal plate portion is also wound in a cylindrical or polygonal shape, wherein the opposite edges of the wound metal plate and the auxiliary metal portion are connected together to form a cylindrical shank portion, wherein the outside surface of the exposed patterned portion of the shank and the auxiliary metal plate portion is covered with a resin layer such that a projection of a synthesis resin is formed at the outside thereof, wherein the shank has a flange made of a synthesis resin projecting outwardly from one tip of the shank, integrally formed with the resin layer, wherein the resin layer covering the outside surface of the formed female screw in the shank is pressed by a press pin from the outside of the metal plate formed into the cylindrical shape so as to avoid the synthesis resin entering from the gap of the connection of the cylindrical metal plate during the forming process, wherein several holes for inserting the press pin for correcting the gap of the connected portion and for maintaining the shape of the metal plate are provided.

The insert t-nut of the twentieth aspect is that in any one of the sixteenth to nineteenth aspects, the predetermined metal plate comprises several sheets, and wherein the several sheets of the metal plates are formed into the shank.

The insert t-nut of the twenty-first aspect is that in any one of the sixteenth to twentieth aspects, the opposite edges for connecting together after being wound cylindrically are formed in a line.

The insert t-nut of the twenty-second aspect is that in any one of the sixteenth to twenty-first aspects, the opposite edges for connecting together after being wound cylindrically are formed in a continuous or discontinuous pattern, or curved in a continuous or discontinuous wave, such that the opposite edges are engaged and connected with each other.

The insert t-nut of the twenty-third aspect is that in any one of the sixteenth to twenty-second aspects, the outside surface of the female screw portion of the shank has formed at least one concave portion, and by forming the concaved portion, the female screw portion is partially disordered The insert t-nut of the twenty-fourth aspect is that in any one of the sixteenth to twenty-third aspects, several pieces of the projections are formed on the outside surface of the shank at a predetermined interval in the perpendicular or circumferential direction, or in a continuous or discontinuous spiral form.

The insert t-nut of the twenty-fifth aspect is that in any one of the sixteenth to twenty-fourth aspects, the shank has a shape in which the diameter thereof is gradually reduced from one end to the tip portion.

The insert t-nut of the twenty-sixth aspect is that in any one of the sixteenth to twenty-fifth aspects, the outside periphery of the flange has a claw of a synthesis resin formed in the direction from one end of the shank to the tip of the shank.

The insert t-nut of the twenty-seventh aspect is that in any one of the sixteenth to twenty-sixth aspects, the outside periphery of the flange has two pairs of claws of a synthesis resin formed in the direction from one end of the shank to the tip of the shank.

The insert t-nut of the twenty-eighth aspect is that in the twenty-seventh aspect the two pairs of the claws are formed to be parallel or generally parallel with respect to the radial direction of the shank.

The insert t-nut of the twenty-ninth aspect is that in any one of the sixteenth to twenty-eighth aspects, wherein the outside periphery of the flange has a projection of a synthesis resin formed in the direction from one end of the shank to the tip thereof.

The insert t-nut of thirtieth aspect is that in any one of the sixteenth to twenty-ninth aspects, the flange is shaped into an octagon or a general octagon, made of a synthesis resin.

The insert t-nut of the thirty-first aspect is that in any one of the sixteenth to thirtieth aspects, the shank has a comparatively thin portion at the tip thereof, which is to be caulked, and wherein the inside surface of the shank being cylindrical except for the to-be-caulked portion has a female screw.

The insert t-nut of the thirty-second aspect is that in the thirty-first aspect, the outside surface of the to-be-caulked portion of the shank is also covered with the resin layer.

An insert t-nut of the thirty-third aspect is that in any one of the sixteenth to thirtieth aspects, the resin layer covering the outside surface of the shank is further integrally formed with the tube portion of a synthesis resin to become the to-be-caulked portion, which is projected from the outside surface of the tip portion of the shank.

EFFECTS OF THE INVENTION

As mentioned above, in the insert nut and the insert t-nut of the present invention, the shank is formed by cylindrically winding a metal plate and the female screw of the shank is formed by pressing a dies on the metal plate or the cylindrically wound metal plate. Thus, compared with a female screw formed through the conventional screwing process, a thinner metal plate can be used, resulting in reducing the cost. Also, since the screwing process does not need to be applied, metal chips are not generated, and therefore, it is unnecessary to waste the metal chips, resulting in reducing the cost.

Also, on the outside surface of the shank, since the screw portion to be the female screw is formed by pressing a dies, the opposite surface has formed patterns, which will be engaged with the resin layer when the outside surface of the shank is covered with the resin layer. Thus, when the insert nut or the insert t-nut is inserted into a hole formed on the table board material and so on in order to fix it to a table leg by volts or screws, the shank is not isolated from the resin layer even if the volts and screws are strongly screwed.

Also, the polygonal portion, with which a rotating tool such as a wrench is engaged, is not formed of a synthesis resin but of the metal plate of the shank, so that even if a rotating tool is engaged with the polygonal portion and strongly screwed, the polygonal portion will not be broken, though the ones of a synthesis resin happen. Thus, it is not necessary that the resin layer for covering the outside surface of the shank is a virgin synthesis resin for having a high strength property, and a recycled synthesis resin can be used, thus resulting in reducing the cost.

BRIEF DESCRIPTION OF THE DRAWINGS

FIG. 2(a) shows a plan view thereof and FIG. 2(b) shows an enlarged cross-sectional view thereof.

FIG. 6 shows a view of the insert nut of the second embodiment of the present invention, and in detail, FIG. 6(a) shows a plan view of the metal plate, FIG. 6(b) shows a view in which the metal plate is cylindrically formed, FIG. 6(c) shows a view in which a screw portion is formed on the metal plate, and FIG. 6(d) shows a perspective view of the insert nut of the second embodiment of the present invention.

FIG. 7(a) shows a plan view of the metal plate, FIG. 7(b) shows a view in which the screw portion is formed at a portion closer to the upper portion on one surface of the metal plate, FIG. 7(c) shows a view in which the metal plate is cylindrically formed, FIG. 7(d) shows a perspective view of the insert nut of the third embodiment of the present invention, and FIG. 7(e) shows a perspective view of the FIG. 7(d).

FIG. 8(a) shows a plan view of the metal plate, FIG. 8(b) shows a view in which the screw portion is formed at a portion except for the portion closer to the upper portion on one surface of the metal plate, FIG. 8(c) shows a view in which the metal plate is shaped to have a polygonal portion integrally formed with the cylindrical portion, FIG. 8(d) shows a perspective view of the insert nut of the fourth embodiment of the present invention, and FIG. 8(e) shows a vertically cross sectional view of the FIG. 8(d).

FIG. 9(a) shows a plan view of the metal plate, FIG. 9(b) shows a view in which the screw portion is formed at a portion except for the portion closer to the lower portion on one surface of the metal plate, FIG. 9(c) shows a view in which the metal plate is shaped to have a polygonal portion integrally formed with the cylindrical portion, FIG. 9(d) shows a perspective view of the insert nut of the fifth embodiment of the present invention, and FIG. 9(e) shows a vertically cross sectional view of the FIG. 9(d).

FIG. 10 shows a view in which the shank of the present invention is formed from two sheets of the metal plates, and in detail, FIG. 10(a) shows a view of two sheets of the metal plates, FIG. 10(b) shows a view in which each of the metal plates are shaped into a semicylinder form, and FIG. 10(c) shows a view in which ends as shown in FIG. 10(b) are connected together to form a cylinder shape.

FIG. 11 shows a view in which the shank of the present invention is formed from three sheets of the metal plates, and in detail, FIG. 11(a) shows a view of three sheets of the metal plates, FIG. 11(b) shows a view in which each of the metal plates are formed into a semicylinder shape, and FIG. 11(c) shows a view in which ends as shown in FIG. 11(b) are connected together to form a cylinder shape.

FIG. 13(a) shows a view in which the ends are formed into a continuous pattern, FIG. 13(b) shows a view in which the ends are formed into a discontinuous pattern.

FIG. 14(a) shows a view in which the ends are formed into a continuous wave pattern, FIG. 13(b) shows a view in which the ends are formed into a discontinuous wave pattern.

FIG. 18(a) shows a perspective view of the insert nut of the seventh embodiment of the present invention, FIG. 18(b) shows a perspective view of the insert nut of the eighth embodiment of the present invention, and FIG. 18(c) shows a vertically cross sectional view of the insert nut as shown in FIG. 18(a) or FIG. 18(b).

FIG. 19(a) shows a perspective view of the insert nut of the ninth embodiment of the present invention, FIG. 19(b) shows a perspective view of the insert nut of the tenth embodiment of the present invention, and FIG. 19(c) shows a perspective view of the insert nut of the eleventh embodiment of the present invention.

FIG. 20(a) shows a plan view of the metal plate, FIG. 20(b) shows a view in which a screw portion is formed on one surface of the metal plate, FIG. 20(c) shows a view in which the metal plate is cylindrically formed, FIG. 20(d) shows a perspective view of the insert t-nut of the eleventh embodiment of the present invention, and FIG. 20(e) shows a vertically cross sectional view of the insert t-nut of FIG. 20(d).

FIG. 21 shows a view of the insert t-nut of the thirteenth embodiment of the present invention, and FIG. 21(a) shows a plan view of the metal plate, FIG. 21(b) shows a view in which the metal plate is cylindrically formed, FIG. 21(c) shows a view in which a screw portion is formed at the metal plate, and FIG. 21(d) shows a perspective view of the insert t-nut of the twelfth embodiment of the present invention.

FIG. 22 shows a view of the insert t-nut of the fourteenth embodiment of the present invention, and FIG. 22(a) shows a plan view of the metal plate, FIG. 22(b) shows a view in which a screw portion is formed at a portion closer to the upper portion of one surface of the metal plate, FIG. 22(c) shows a view in which the metal plate is cylindrically formed, and FIG. 22(d) shows a perspective view of the insert t-nut of the thirteenth embodiment of the present invention.

FIG. 25(a) shows a perspective view including a partial cross sectional view of the insert t-nut, in which two pairs of the claws are formed, each being opposed with respect to the radial direction of the flange portion, and FIG. 25(b) shows a perspective view including a partial cross sectional view of the insert t-nut same as the example of FIG. 25(a) except for the shape of the flange portion.

FIG. 31(a) shows a perspective view including a partial cross sectional view of the insert t-nut of the eighteenth embodiment of the present invention, in which the shank has a to-be-caulked portion, FIG. 31(b) shows a perspective view of the insert t-nut of the nineteenth embodiment of the present invention, in which the shank has a to-be-caulked portion, and FIG. 31(c) shows a perspective view including a partial cross sectional view of the insert t-nut of the twentieth embodiment of the present invention, in which the to-be-caulked portion is made of a synthesis resin.

FIGS. 32(a) to(d) show plan views and front views of various insert nuts of the present invention.

FIGS. 33(a) to(d) show a plan view, a vertically cross sectional view, a bottom view and a side view of the insert nut as another embodiment of the present invention.

FIGS. 34(a) to (c) show a plan view, a bottom view and a vertically cross sectional view of the insert nut as another embodiment of the present invention.

FIGS. 35(a) to (d) show a plan view, a vertically cross sectional view, a bottom view and a side view of the insert nut as another embodiment of the present invention.

FIGS. 36(a) to (c) show a front view, a plan view and a vertically cross sectional view of the insert nut as another embodiment of the present invention.

FIGS. 40(a) to (d) show a plan view, a vertically cross sectional view, a bottom view and a side view of the insert t-nut as another embodiment of the present invention.

FIG. 41(a) shows a bottom view of the insert t-nut of another embodiment of the present invention, FIG. 41(b) shows a front view thereof, and FIG. 41(c) shows a plan view including a partial cross sectional view.

FIG. 42(a) shows a plan view in which a screw portion is formed on a metal plate with an auxiliary metal plate portion, FIG. 42(b) shows a left side view of the example as shown in FIG. 42(a), and FIG. 42(c) shows a right side view of the example as shown in FIG. 42(a).

FIG. 43(a) shows a plan view of the insert t-nut, FIG. 43(b) shows a side view thereof, FIG. 43(c) shows a vertically cross sectional view of FIG. 43(c), and FIG. 43(d) shows a horizontal cross sectional view of FIG. 43(b).

FIG. 44 shows views of the insert t-nut of the twenties-first embodiment of the present invention, and FIG. 44(a) shows the auxiliary metal portion is formed into a polygonal shape, and FIG. 44(b) shows an illustrative view to show the process in which the metal plate and the auxiliary metal portion are wound.

FIG. 45 shows a perspective view of the insert nut of the prior art.

FIG. 46 shows a vertically cross sectional view of the example as shown in FIG. 45.

DETAILED DESCRIPTION OF THE INVENTION

Figure 1:
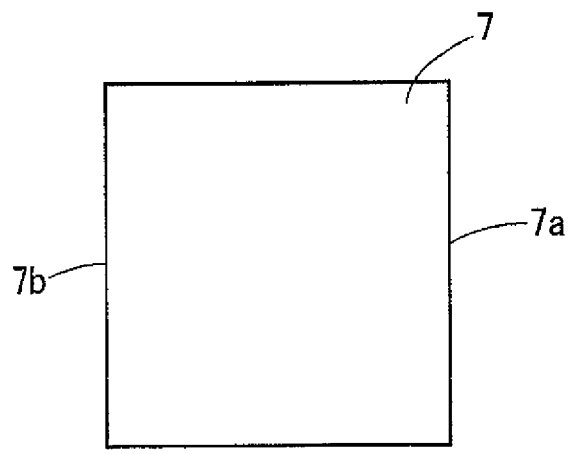
FIG. 1 shows a plan view of the example of the metal plate of the present invention.
Figure 2:
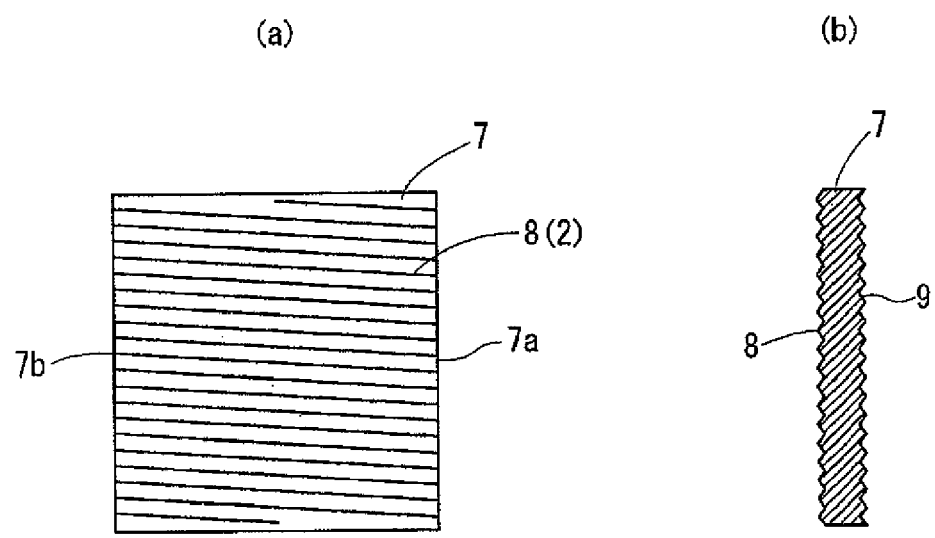
FIG. 2 shows a view in which a screw portion is formed on the metal plate, and in detail.

Hereinafter, embodiments of the present invention are described based on the drawings. It should be noted that the same numerals are used for the corresponding portions of the embodiments shown in the drawings for convenience. In the drawings as attached, the screw portion 8 and pattern portion 9 formed of the metal plate 7 as explained later are briefly shown in the drawings except for the numeral 42 and so on.

Figure 4:
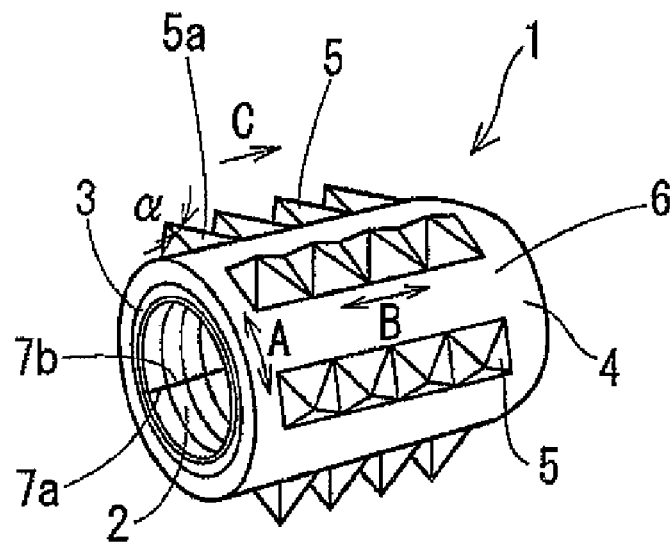
FIG. 4 shows a perspective view of the insert nut of the first embodiment of the present invention.
Figure 5:
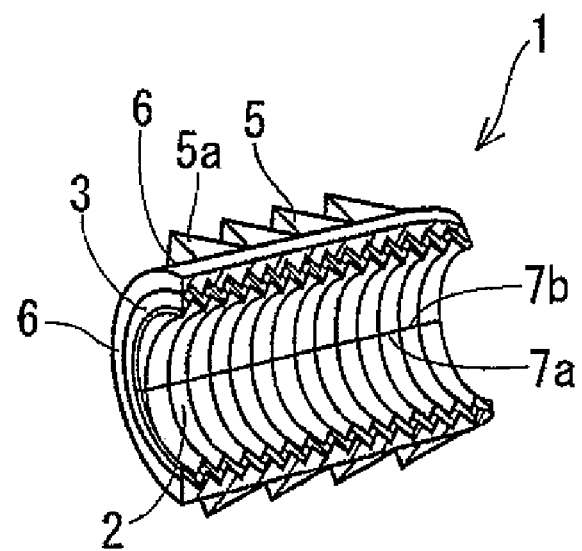
FIG. 5 shows a cross sectional view in the perpendicular direction of the insert nut of the first embodiment of the present invention as shown in FIG. 4.

First, the insert nut of the present invention is described. FIGS. 1 to 5 show the insert nut 1 of the first embodiment of the present invention. As shown in FIGS. 4 and 5, the insert nut 1 comprises a cylindrical shank 3 having a female screw 2, and a resin layer 6 having projections 5 at the outside surface 4.

That is, the shank 3 is formed, as shown in FIG. 1. A rolling dies (not shown in the drawings) is pressed on one surface of a thin, flat square (or rectangular) metal plate 7 having a predetermined size to form a screw portion 8 (See FIG. 2.) from one end (upper end) to another end (lower end), which will become a female screw portion 2. The metal plate 7 is cylindrically wound such that the screw portion 8 is located inside so as to form a cylindrical form (See FIG. 3.), and then the opposite ends 7a, 7b of the wound metal plate are connected together. As described here, when a dies (not shown in the drawings) is pressed to form the screw portion 8 on the metal plate 7, a patterned portion 9 is formed on the other surface of the metal plate 7 by the press forming of the screw portion 8.

The outside surface 10 of the exposed patterned portion 9 of the shank 3 as formed above is covered with a rigid resin layer 6 having projections 5 at the outside thereof (a layer formed of a synthesis resin such as polypropylene) so as to form the first embodiment of the insert nut 1. Also, the aforementioned projections 5 are formed at the outside of the resin layer 6 such that they are formed in the circumferential direction B of the shank 3 (arrow A in FIG. 3) at a certain interval over the whole of the circumference, as well as such that they are continuously formed in the length direction (arrow B in FIG. 3) of the shank 3. Each projection portion 5a of the projections 5 is formed into a deformed pyramid shape having a declination angle a such that the insert nut 1 is easily inserted into and difficultly released from the bottom hole of the material to be attached. The arrow C in FIG. 3 shows the direction for inserting into the bottom hole.

It should be noted that the synthesis resin to form the resin layer 6 can be a recycled synthesis resin. Also, the size, shape and location of the projection portion 5*a* are not limited to the ones illustrated in the drawings, and can be replaced with other size, shape and location. The thickness of the resin layer 6 other than the projection portion 5*a* may be predetermined to have a certain thickness. Also, at least the portion where the female screw 2 is formed is plated.

Figure 3:
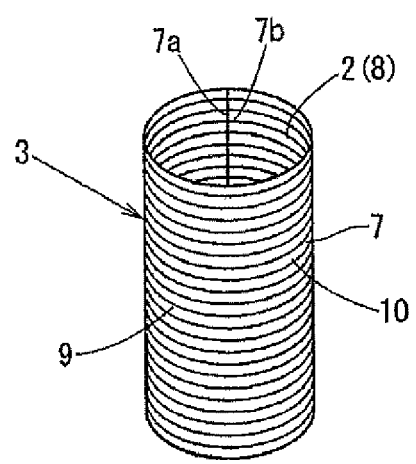
FIG. 3 shows a view illustrating the state in which the metal plate as shown in FIG. 2 is cylindrically formed.

In case where a table board (not shown in the drawings) is attached to a table leg using the insert nut 1, the insert nut 1 is inserted into and engaged with the bottom hole formed on the table board in the direction of arrow C in FIG. 3, such that the projections 5 are engaged with the inside of the table board so as to firmly attach the insert nut 1 to the table board. Also, the female screw 2 of the shank 3 of the insert nut 1 is screwed with a screw or volt put into from the hole formed on the flange of the table leg, so as to firmly attach the table board to the table leg.

FIGS. 6(*a-d*) show the second embodiment of the insert nut 1 of the present invention. The insert nut 1 has, in a similar manner to the first embodiment as explained above, a cylindrical shank 3 with female screw 2 and a resin layer 6 with projections 5 at the outside surface 4.

In this embodiment, the metal plate 7 such as the aforementioned one (FIG. 6(*a*).) is, first of all, cylindrically wound, and the opposite edges 7*a*, 7*b* are connected together (FIG. 6(*b*)). Then, a dies is pressed on the inside and outside surfaces to form a screw portion 8 to be a female portion 2 at the inside surface, so as to form a shank 3 similar to the first embodiment. The other structures are similar to the first embodiment, so the same portions are shown by the same numerals respectively to omit the detail description.

Figure 7:
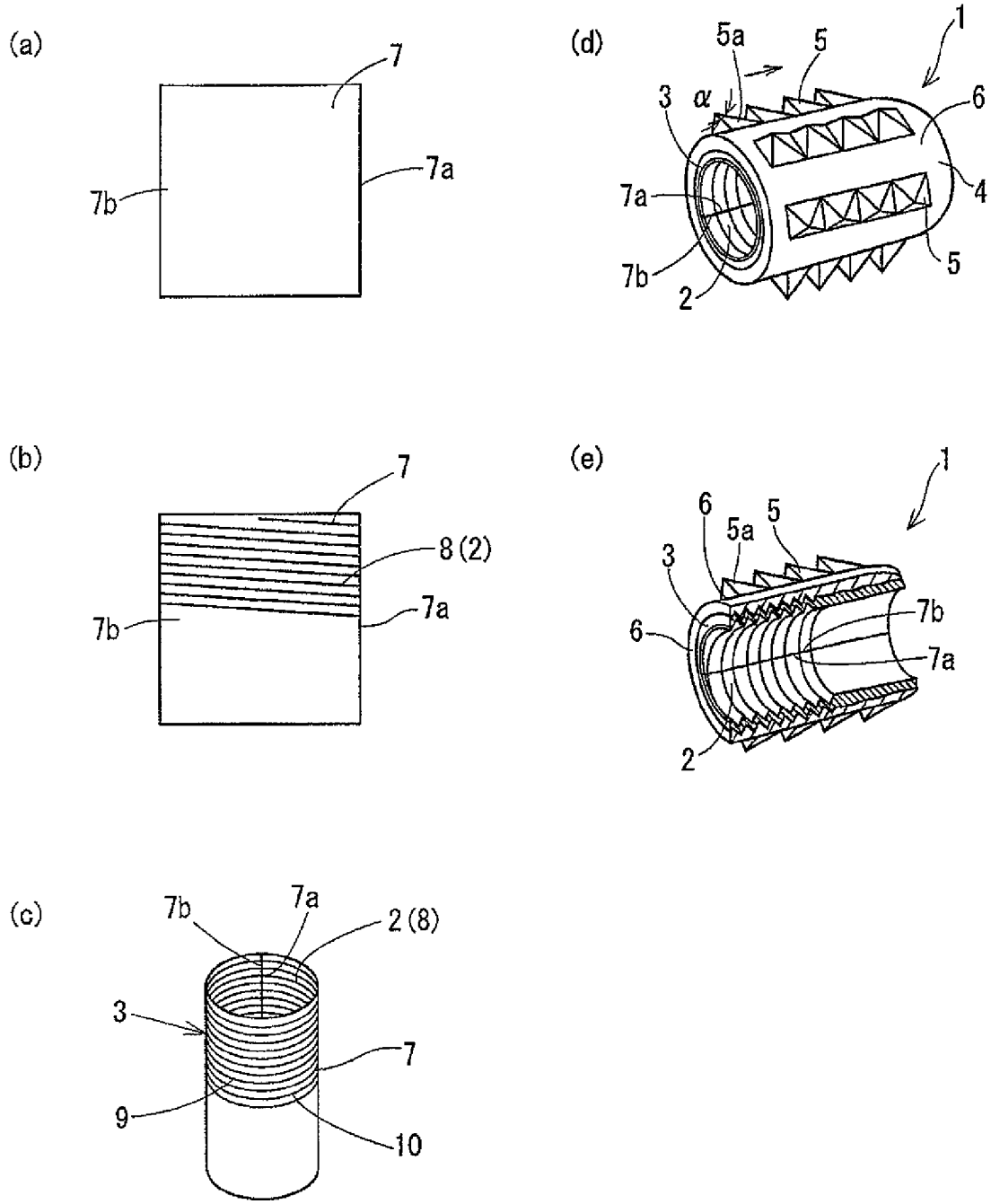
FIG. 7 shows a view of the insert nut of the third embodiment of the present invention, and in detail.

FIGS. 7(*a-e*) show the third embodiment of the insert nut 1 of the present invention. The insert nut 1 has a cylindrical shank 3 with female screw 2 which is formed partially, and a resin layer 6 with projections 5 at the outside surface 4.

That is, in this embodiment, a rolling dies (not shown in the drawings), in the similar manner to the first embodiment, is pressed on a portion of one surface of a predetermined metal plate (In FIG. 7(*a*), it is pressed on the top part of the metal plate, but it can be pressed on the middle or lower part thereof.) to form a screw portion 8 to become a female screw 2 (FIG. 7(*a*) and FIG. 7(*b*)). Then, the metal plate is wound such that the screw portion is located inside so as to form a cylindrical form (FIG. 3), and the opposite edges 7*a*, 7*b*, of the wound metal plate are connected together to form a shank 3 (FIG. 7(*c*)). The outside surface 4 of the shank 3 is covered with a resin layer 6 having projections 5 to form the third embodiment of the insert nut 1 (FIG. 7(*d*)). The other structures are similar to the first embodiment, so the same portions are shown by the same numerals respectively to omit the detail description.

Figure 8:
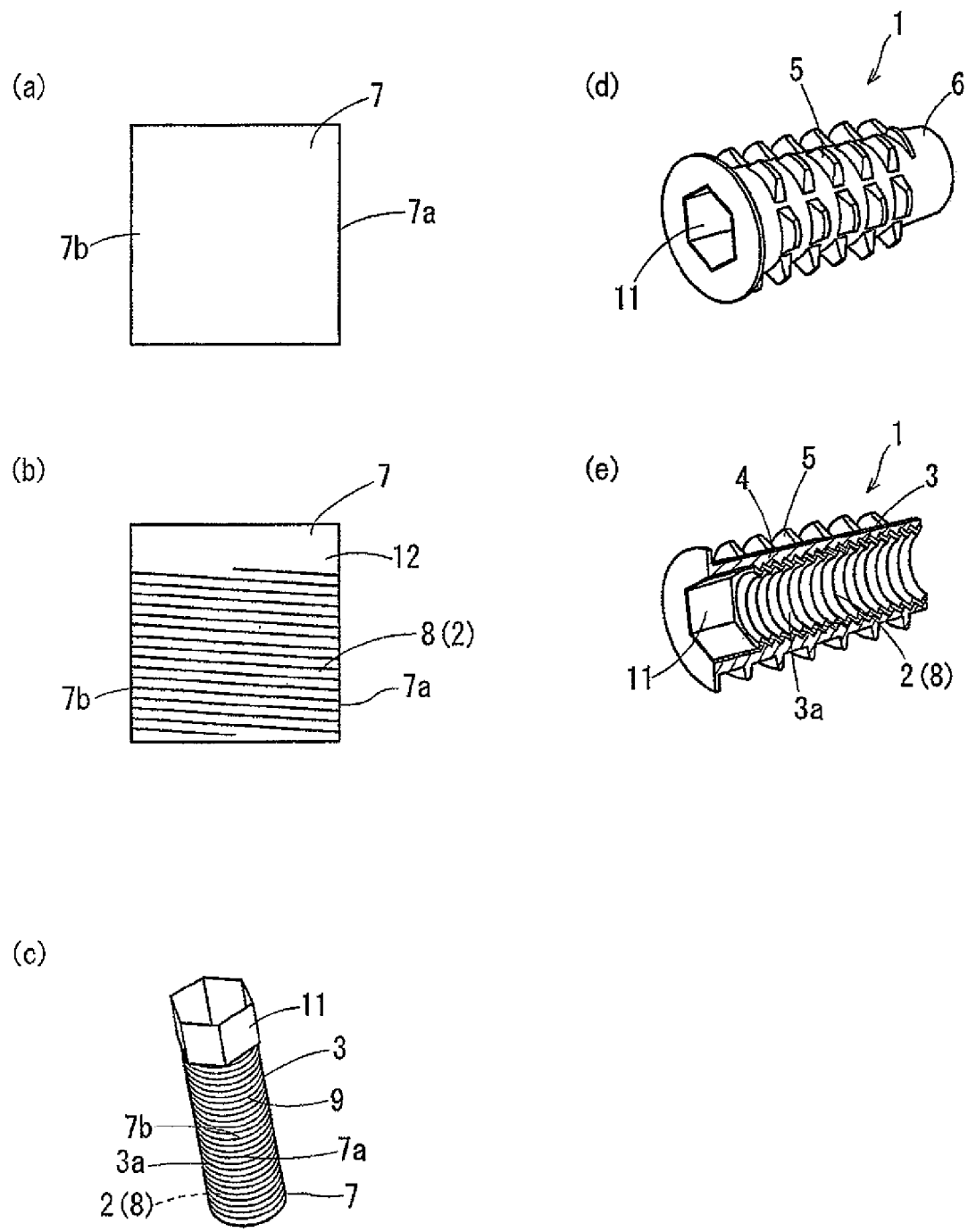
FIG. 8 shows a view of the insert nut of the fourth embodiment of the present invention, and in detail.

FIGS. 8(*a-e*) show the fourth embodiment of the insert nut 1 of the present invention. The insert nut 1 has a polygonal portion 11, cylindrical and hollow shank 3 with female screw 2 at the inside surface, and a resin layer 6 with projections 5 at the outside surface 4.

That is, in this embodiment, a rolling dies (not shown in the drawings), in the same manner as the first embodiment, is pressed on one surface of a predetermined metal plate 7 to form a screw portion 8 to become a female screw 2 except for a portion 12 having a predetermined width at the upper portion of the metal plate 7. The metal plate is wound such that the screw portion 8 to become a female portion 2 is located inside. A polygonal shape is formed at the portion without the screw portion 8 at the upper portion of the metal plate, and a cylindrical shape is formed at the portion where the screw portion 8 is formed. The opposite edges 7*a*, 7*b* of the wound metal plate are connected together to form a polygonal portion 11, and a hollow shank 3 of cylindrical portion 3*a* with female screw 2 (FIG. 8(*c*)). The polygonal portion 11 is formed to be hexagonal for engaging with a tool such as hexagonal wrench. The polygonal portion 11 is not limited to be hexagonal, but can be shaped into another form.

By the forming of the screw portion 8, a pattern 9 is formed on the other surface of the metal plate 7. The exposed and cylindrical outside surface of the aforementioned pattern 9 of the shank 3 is covered with a resin layer 6 having projections 5 at the outside thereof, which is made of a synthesis resin. The outside surface of the polygonal portion 11 is also covered with the resin layer 6 (Figs. (d) and (e)), so as to form the fourth embodiment of the insert nut 1. The other structures are similar to the first embodiment, so the same portions are shown by the same numerals respectively to omit the detail description.

Figure 9:
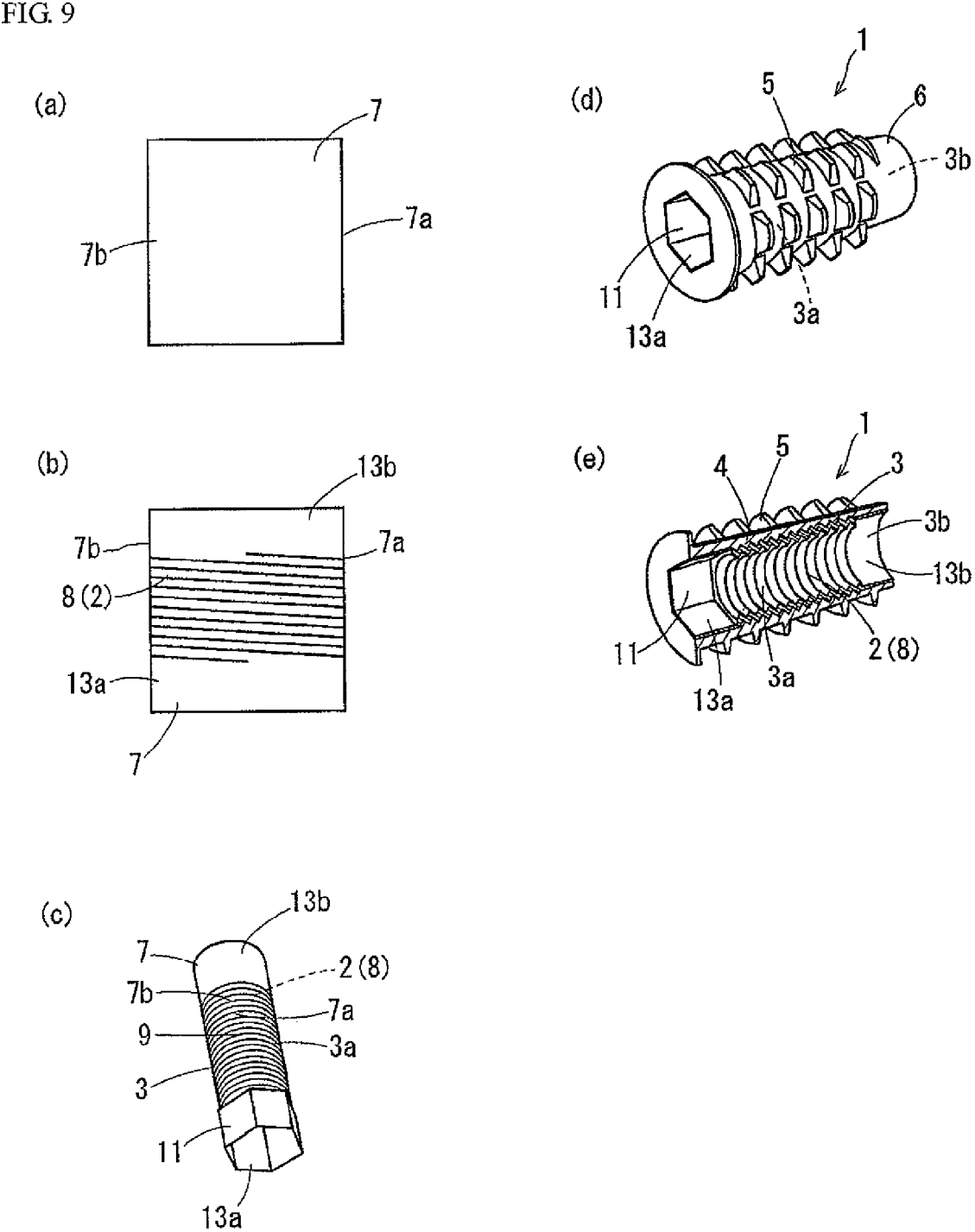
FIG. 9 shows a view of the insert nut of the fifth embodiment of the present invention, and in detail.

FIGS. 9(*a-e*) show the fifth embodiment of the insert nut 1 of the present invention. In the same manner as the aforementioned fourth embodiment (FIGS. 8(*d*), (*e*)), the insert nut 1 also has a cylindrical and hollow shank 3 having a polygonal portion 11, a cylindrical portion 3*a* with female screw 2, a cylindrical portion 3*b* without female screw 2 at the inside surface, and a resin layer 6 with projections 5 at the outside surface 4.

That is, in this embodiment, a rolling dies (not shown in the drawings) is pressed on one surface of a predetermined metal plate 7 to form a screw portion 8 to become a female screw 2 except for an upper portion 13*a* and a lower portion 13*b*, each having a predetermined width, of the metal plate 7. The metal plate is wound such that the screw portion 8 to become a female portion 2 is located inside. A polygonal shape is formed at the portion 13*a* without the screw portion 8 at the upper portion of the metal plate, and a cylindrical shape is formed at the portion where the screw portion 8 is formed and the lower portion 13*b*. The opposite edges 7*a*, 7*b* of the wound metal plate are connected together to form a cylindrical and hollow shank 3 (Fig. (c)) having a polygonal portion 11, a cylindrical portion 3*a* with female screw 2, a cylindrical portion 3*b* without female screw 2, and a resin layer 6 with projections 5 at the outside surface 4. Also, the projections 5 are formed in the outside surface of the resin layer 6 covering the outside surface of the cylindrical portion 3*a* having the female screw 2. The other structures are similar to the fourth embodiment, so the same portions are shown by the same numerals respectively to omit the detail description.

It should be noted that in the insert nut 1 as described as the first to fifth embodiments of the present invention, the metal plate forming the shank 3 can comprise several sheets of the metal plates 7*c* (7*d*) as shown in FIGS. 10 and 11. FIG. 10 shows an embodiment in which the cylindrical shank is made of two sheets of the metal plates 7*c*, and FIG. 3 shows an embodiment in which the cylindrical shank is made of three sheets of the metal plates 7*d*. Of course, it is possible to use four or more sheets of the metal plates to form the shank of the present invention. Although the drawings do not show that the shank with the polygonal portion 11 is formed by several sheets of the metal plates, the shank with the polygonal portion can be also formed by several sheets of the metal plates. The screw portion is formed on each of the metal plates in the same manner as the first to fifth embodiments.

Figure 12:
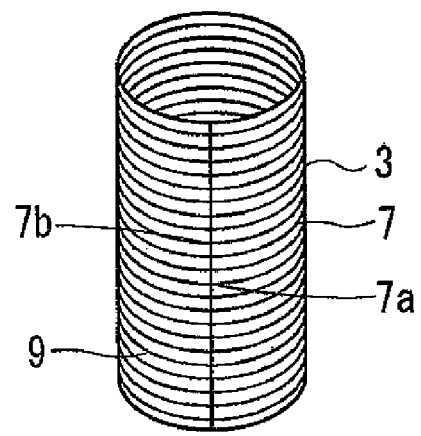
FIG. 12 shows a view in which straight ends of the metal plates are formed for forming the shank of the present invention.
Figure 13:
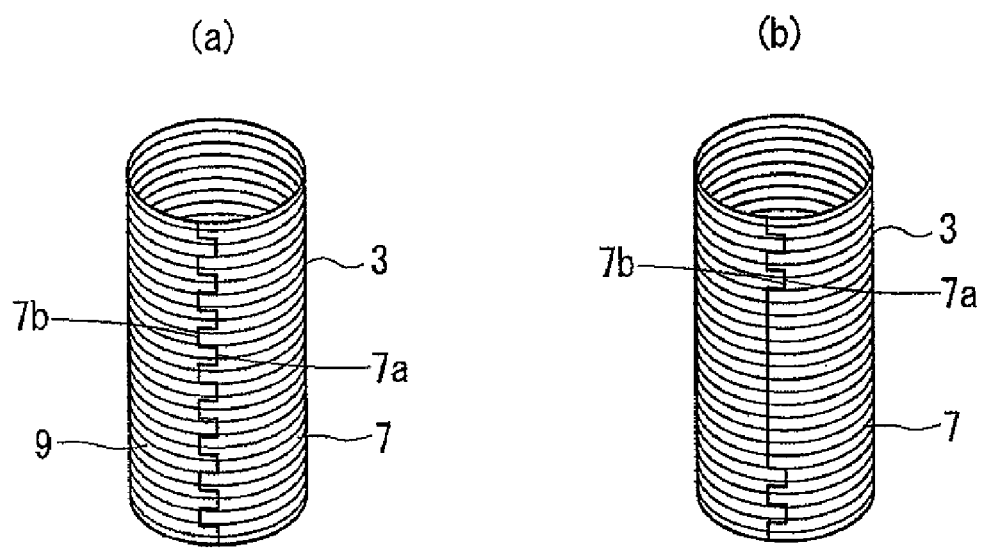
FIG. 13 shows views of the ends of the metal plates for forming the shank of the present invention, and in detail
Figure 14:
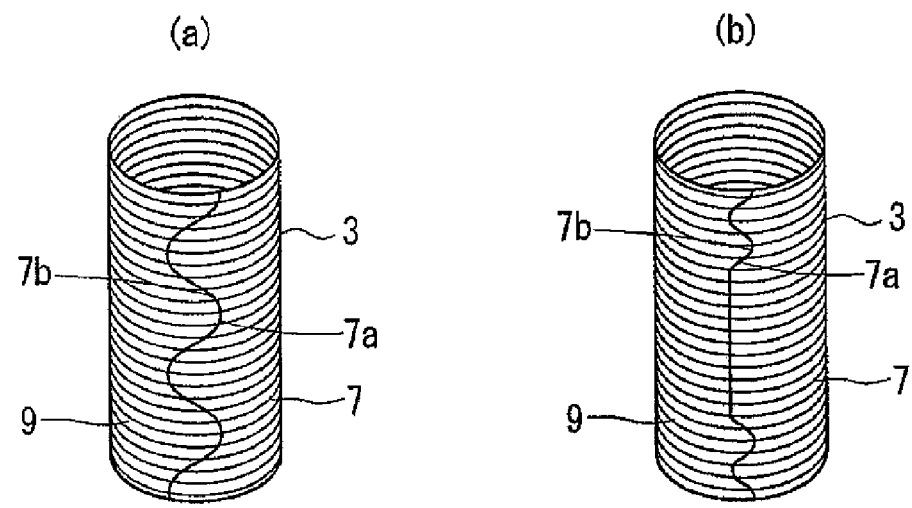
FIG. 14 shows views of the ends of the metal plates for forming the shank of the present invention, and in detail.

Also, opposite ends 7*a*, 7*b*, where the metal plate 7 (7*c*, 7*d*) is cylindrically wounded to connect, can be linier as shown in FIG. 12, continuously patterned (FIG. 13*a*) or discontinuously patterned (FIG. 13*b*) as shown in FIG. 13, or continuously waved (FIG. 14*a*) or discontinuously waved (FIG. 14*b*)

as shown in FIG. 14. Using the shank 3 formed by connecting the opposite ends as formed above (of course, there is a screw portion formed as explained in the embodiments), the insert nuts 1 of the embodiments are formed. Of course, the opposite ends can be shaped in a form other than the above.

Figure 15:
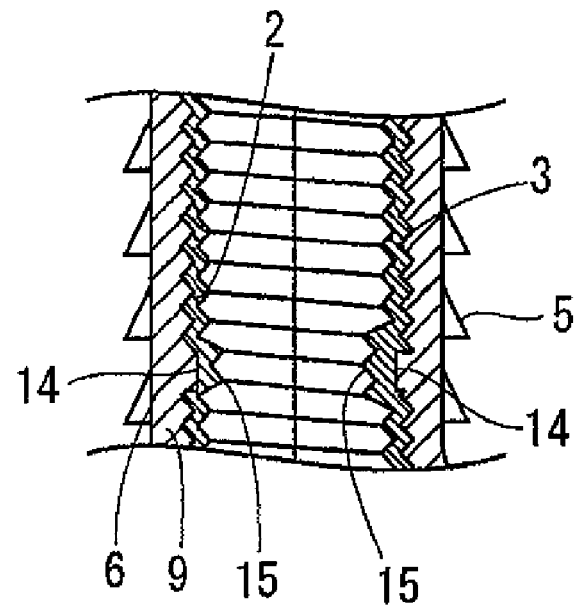
FIG. 15 shows a view of vertically cross sectional view of the insert nut, which has a concaved portion.
Figure 16:
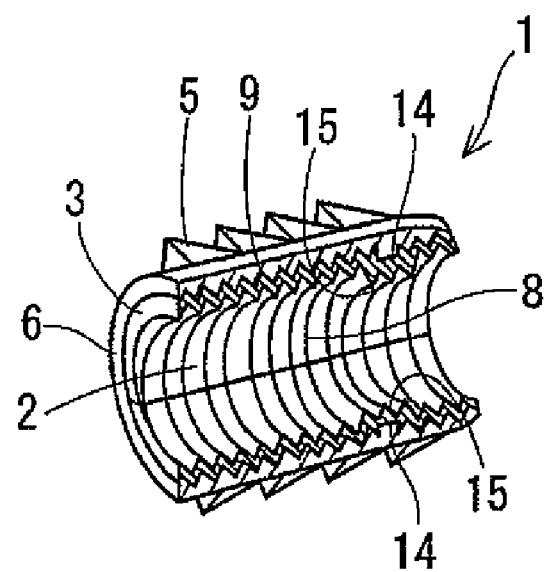
FIG. 16 shows an enlarged view of vertically cross sectional view of the insert nut which has a concaved portion.

Also, in the insert nut 1 of the present invention, the shank 3, as shown in FIGS. 15 and 16, has at least one concave portion 14 on the outside surface corresponding to the female screw 2. By forming the concave portion 14, the screw heads 15 of the female screw 2 are partially disordered. The concave portion 14 is formed at a part of the outer surface by pressing inwardly the outside surface corresponding to the female screw 2 of the shank 3. By forming the concave portion 14, a part of the screw heads of the female screw is disordered, and when a volt is screwed with the female screw 2, the volt has to be firmly screwed at the disordered portion. At that time, a part of the disordered screw heads is deformed so as to engage the volt with the screw heads of the female screw 2, resulting in avoiding the volt from loosing. The number of the concave portion 14 as formed can be one, or two or more.

Figure 17:
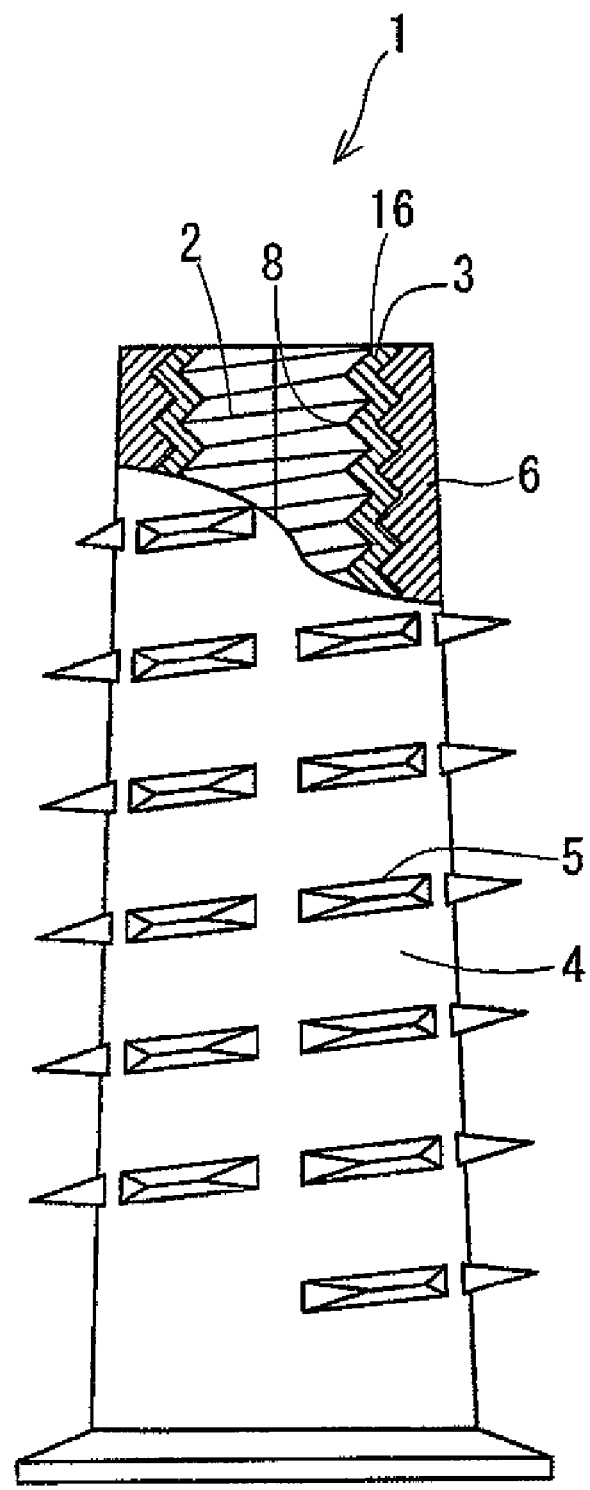
FIG. 17 shows a plan view including a partial cross sectional view of the insert nut of the sixth embodiment of the present invention.

Also, in the case of the insert nut 1 without the polygonal portion according to the present invention, the shank 3 can have a shape whose outside diameter is gradually reduced from one end to the tip portion 16. For example, an insert nut of the sixth embodiment is shown in FIG. 17.

Also, in the insert nut 1 of the present invention 1, the projections 5 can be formed, as explained before, at the outside surface 4 of the shank 3 at a certain interval in the direction from the one end to the tip end, or in the radial direction. Alternatively, the projections 5 can be formed in a discontinuous spiral shape as shown in the insert nut 1 of the seventh embodiment of FIG. 18(a)(c), or in a continuous spiral shape as shown in insert nut 1 of the eighth embodiment of FIG. 18(b)(c).

Also, in the insert nut of the present invention, the insert nut of the ninth embodiment has the shank 3 (as shown in FIG. 19(a)), which has a to-be-caulked portion 22 at the tip portion, being a comparatively thin portion. At the inside surface of the cylindrical shank other than the to-be-caulked portion 22, the female screw 2 is formed. On the outside surface of the shank 3 other than the to-be-caulked portion 22, the resin layer 6 having projections 6 is covered. Of course, the shank 3 is formed by winding the metal plate 7 (7c, 7d)).

Also, in the insert nut 1 of the tenth embodiment of the present invention, it has the same construction as the shank and the to-be-caulked portion 22 as shown in FIG. 19(b). The to-be-caulked portion 22 has the resin layer 6 on the outside surface thereof. Of course, the shank 3 is formed by winding the metal plate 7 (7c, 7d).

Also, in the insert nut 1 of the eleventh embodiment of the present invention (referring to Fig. (c)), the metal plate 7 (7c, 7d) forms the shank 3 having the female screw 2 (In this case, the shank 3 does not have the to-be-caulked portion 22 of the metal plate 7 (7c, 7d).). The outside surface of shank is covered with the resin layer 6, and a synthesis resin projecting from the outside surface of the tip of the shank is formed to be a cylinder portion 23, that is, a to-be-caulked portion 22a, which is integrally formed with the resin layer 6.

Figure 20:
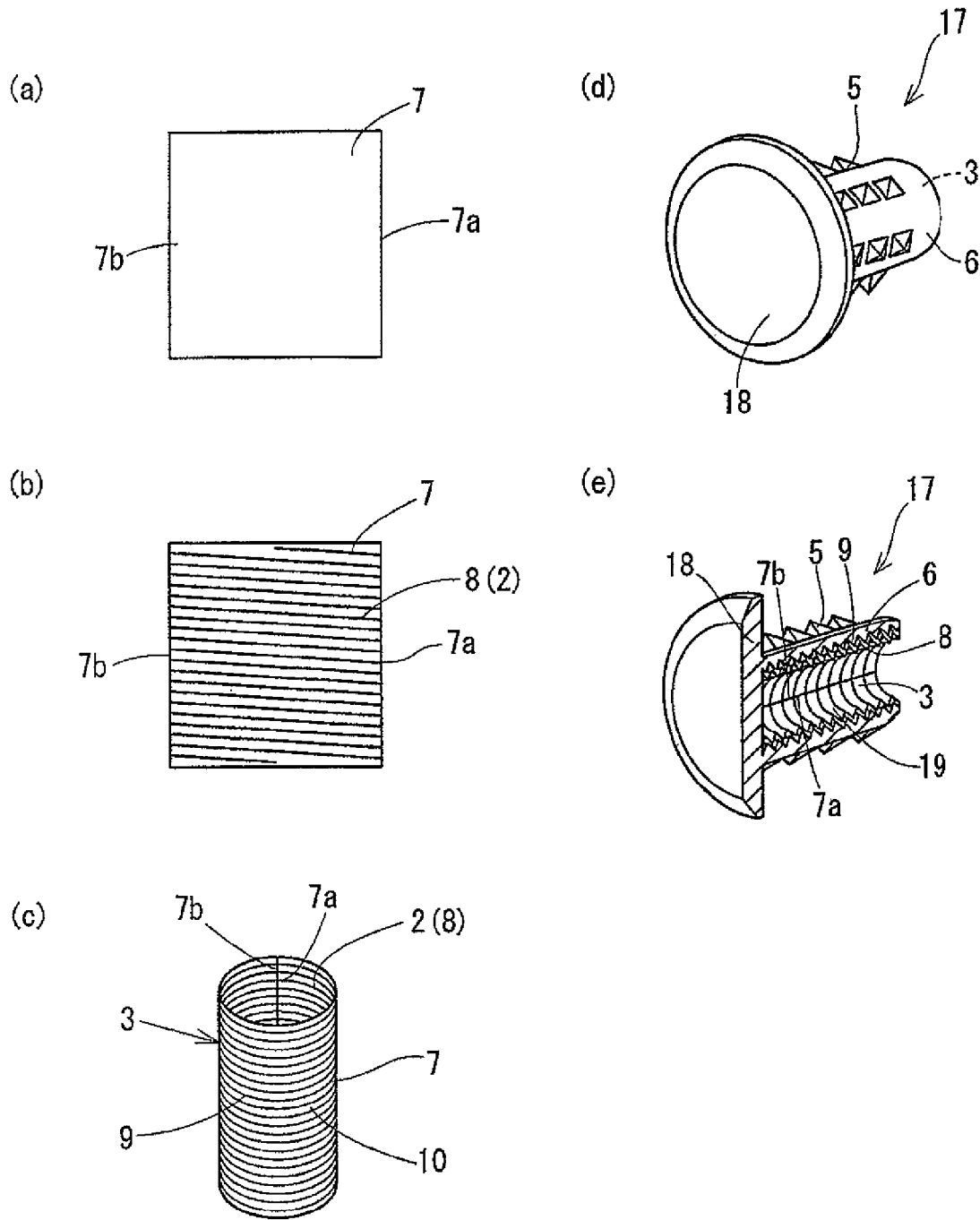
FIG. 20 shows a view of the insert t-nut of the twelfth embodiment of the present invention.

Next, the insert t-nut of the present invention is described. FIGS. 20(a-e) show the insert t-nut 17 of the twelfth embodiment of the present invention, which has a similar construction as the insert nut 1 of the first embodiment as explained above, so that the same portions are numbered as the same numerals, omitting the detail explanation. In the embodiment, the shank 3 is covered with a resin layer 6 having projections 5 at the outside thereof, and further, a flange portion 18 of a synthesis resin is integrally formed with the resin layer 6, the flange portion being projected outwardly from one end (lower end) of the shank 3. It should be noted that the drawing shows that the one end of the shank is covered with the flange portion 18 of a synthesis resin, but the flange 18 can be provided with a hole to communicate with the hollow in the shank 3 at the center of the flange 18.

FIGS. 21(a-e) show the insert t-nut 17 of the thirteenth embodiment of the present invention, the shank of which has a similar construction to the insert nut 1 of the second embodiment as explained above, so that the same portions are numbered as the same numerals, omitting the detail explanation. In the embodiment, similar to the insert t-nut 17 of the twelfth embodiment, the shank 3 is covered with a resin layer 6 having projections 5 at the outside thereof and further, a flange portion 18 of a synthesis resin is integrally formed with the resin layer 6, the flange portion being projected outwardly from one end (lower end) of the shank 3.

FIGS. 22(a-d) show the insert t-nut 17 of the fourteenth embodiment of the present invention, the shank of which has a similar construction as the insert nut 1 of the third embodiment as explained above, so that the same portions are numbered as the same numerals, omitting the detail explanation. (See FIG. 22(c)).

Also in the embodiment, similar to the insert t-nut 17 of the twelfth embodiment, the shank 3 is covered with a resin layer 6 having projections 5 at the outside thereof, and further, a flange portion 18 of a synthesis resin is integrally formed with the resin layer 6, the flange portion being projected outwardly from one end (lower end) of the shank 3.

It should be noted that in the insert t-nut 17 of the twelfth to fourteenth embodiments of the present invention, the metal plate for forming each shank 3 of the each embodiment can be composed of several sheets of the metal plates 7c, 7d as shown in FIGS. 10 and 11. Of course, the metal plate for forming the shank 3 can be composed of four or more sheets of the metal plates.

Also, in the insert t-nut 17 of the twelfth to fourteenth embodiments of the present invention, similar to the shank 3 of the insert nut 1 as explained above, the side ends 7a, 7b of the metal plate 7 (7c, 7d) can be, as shown in FIGS. 12 to 14, straight, or alternatively, continuously patterned or discontinuously patterned to be engaged with each other, or continuously waved or discontinuously waved to be engaged with each other. Of course, the side ends 7a, 7b of the metal plate 7 (7c, 7d) can be formed into the shapes other than the above.

Figure 23:
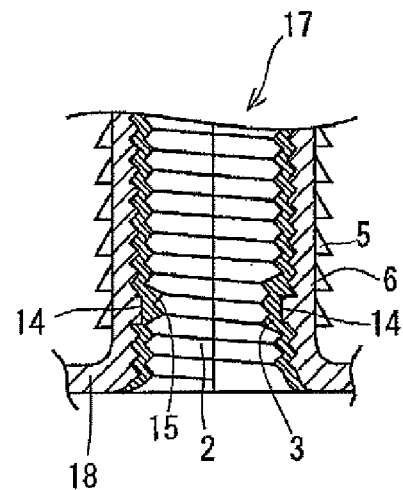
FIG. 23 shows a vertically cross sectional view of a part of the insert t-nut having a concave portion.

Also, in the insert t-nut 17 of the present invention, the shank 3, as shown in FIG. 23, has the outside surface corresponding to the female screw 2, which has at least one concave 14. By the formation of the concave 14, the screw head 15 of the female screw 2 is partially disordered. The concave 14 is formed by inwardly pressing a part of the outside surface corresponding to the female screw 2 on the shank 3. The concave 14 can be preferably formed at a portion closer to the flange portion 18. It is acknowledged that the number of the concave portion can be one, or two or more. By forming the concave portion 14, the screw head of the female screw 2 is partially disordered, and therefore, when a volt is screwed with the female screw 2, the volt needs to be rotated comparatively strongly. At that time, the screw head of the disordered portion is deformed so as to make the screw-engagement with the female screw into a locked condition, resulting in avoiding the volt from loosing.

Similar to the projections 5 of the insert nut 1, the insert t-nut 17 of the present invention has formed projections 5 of a synthesis resin at the outside surface of the shank 3 in the perpendicular direction (that is, in the direction from one end to the tip portion, or in the direction from the tip portion to the one end), or in the radial direction, at a certain interval. Of course, the projection 5 can be continuously or discontinuously formed on the outside surface in a spiral manner. (Refer to the insert nut as shown in FIGS. 18(*a*) and (*b*).)

Figure 24:
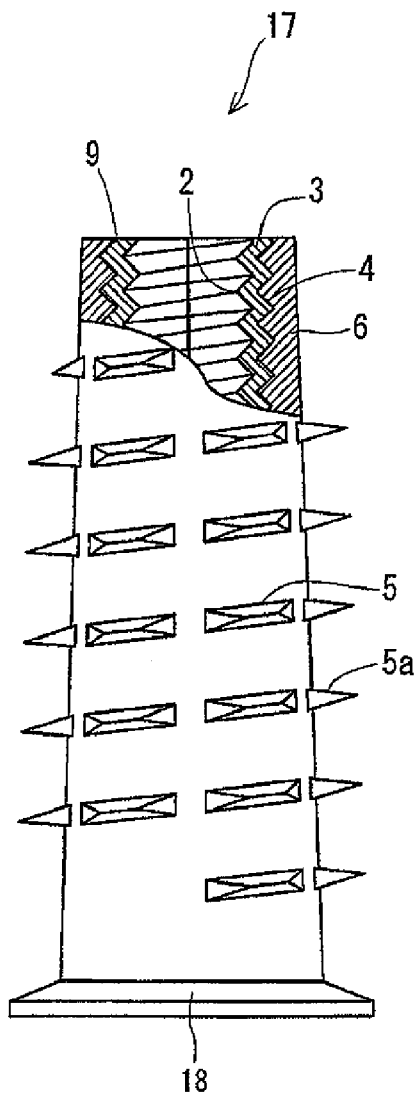
FIG. 24 shows a plan view including a partial cross sectional view of the fifteenth embodiment of the present invention, in which the outside diameter is gradually reduced from one end to the tip portion.

Also, in the insert t-nut 17 of the present invention, the shank 3 can have a cylinder shape whose outside diameter is gradually reduced. As such an insert t-nut, an insert t-nut 17 as the fifteenth embodiment of the present invention is illustrated in FIG. 24.

Also, in the insert t-nut of the present invention, the outside surface of the flange portion 18 has, as shown in FIGS. 25(*a*) and (*b*), claws 20 extending from one end of the shank 3 to the tip portion, which are integrally formed with the resin layer 6 of a synthesis resin. It is acknowledged that the claws 20 can be formed into a notched shape, hook shape, straight shape or other shape, and the shape of the claw is not limited.

In the embodiment as shown in FIGS. 25(*a*) and (*b*), two pairs of the claws 20 are formed on the flange portion 18 in the direction to extend from one end to the tip portion.

Figure 26:
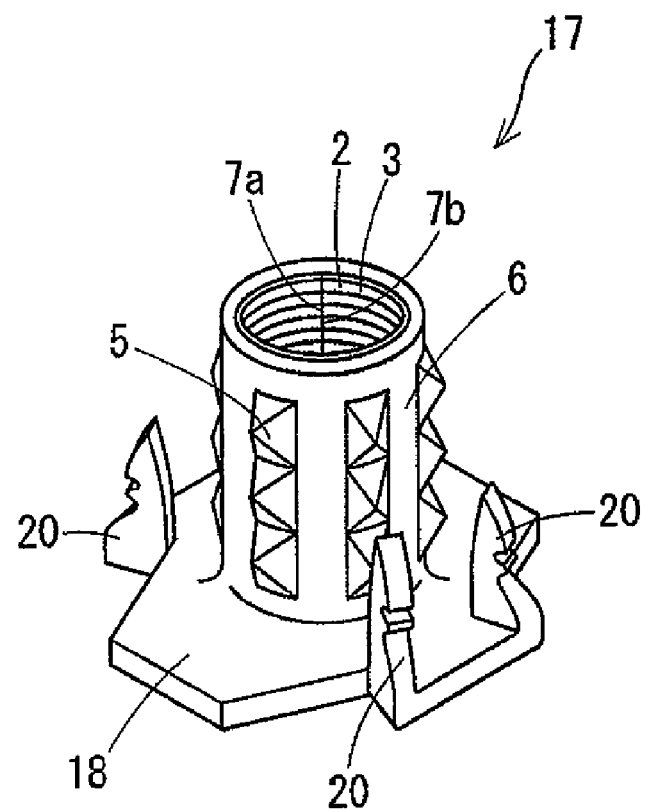
FIG. 26 shows a perspective view of the insert t-nut of the sixteenth embodiment of the present invention, in which two pairs of the claws are formed, each being opposed with respect to the radial direction of the flange portion.
Figure 27:
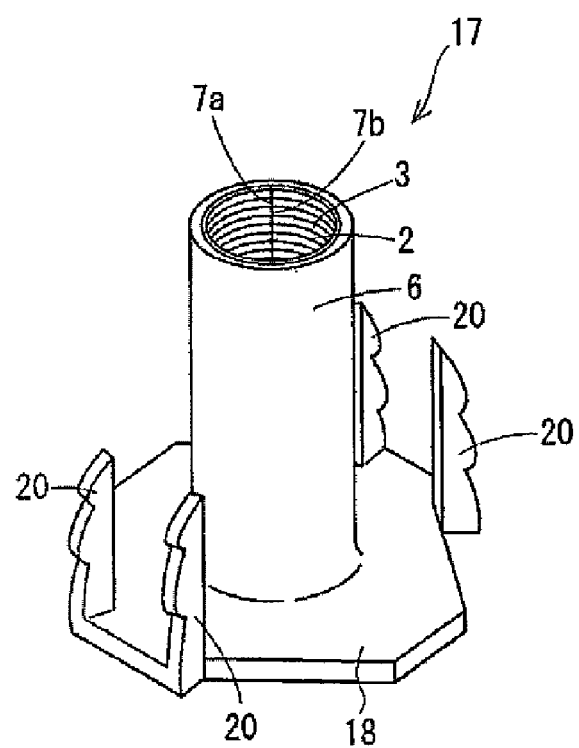
FIG. 27 shows a perspective view of the insert t-nut of the seventeenth embodiment of the present invention, in which two pairs of the claws are formed, each being parallel or almost parallel.

As shown in FIG. 26, the insert t-nut 17 of the sixteenth embodiment has two pairs of the claws as being opposed to the radial direction of the flange portion 18. Also, as shown in FIG. 27, the insert t-nut of the seventeenth embodiment has two pairs of the claws 20, each pair being parallel. Also, in the insert t-nut as shown in FIGS. 25(*a*) and (*b*), the periphery 18*a*, 18*b* of the flange portion 18 formed between the claws can be straight (as shown in FIG. 25(*a*)), or curved (as shown in FIG. 25(*b*)).

Figure 28:
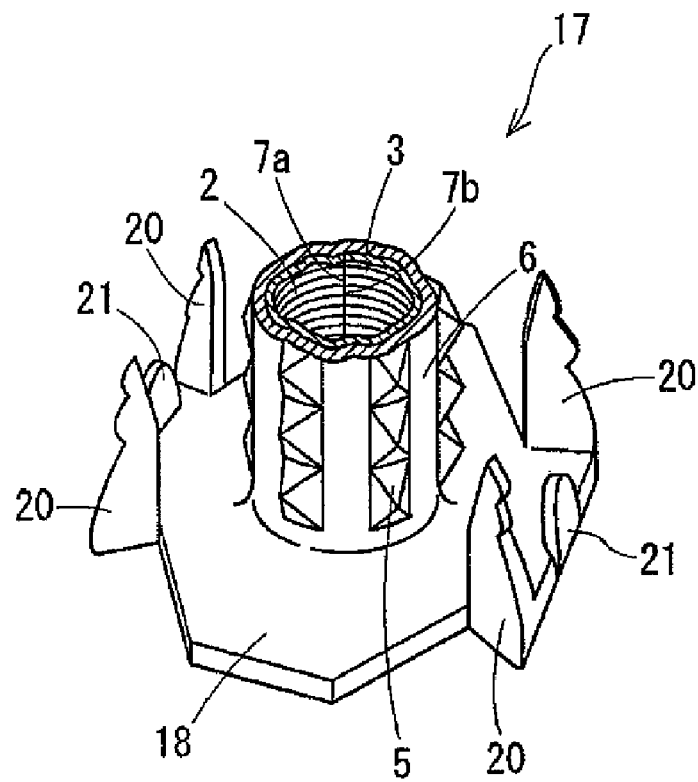
FIG. 28 shows a perspective view including a partial cross sectional view of the insert t-nut of the present invention, in which the periphery of the flange portion has a projected portion of a synthesis resin which is extended in the direction from one end of the shank to the tip portion thereof.
Figure 30:
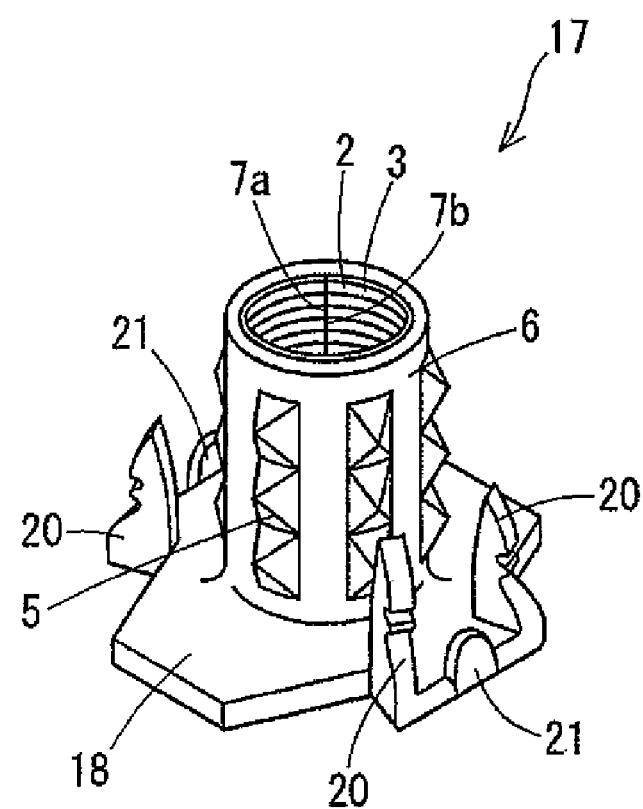
FIG. 30 shows a perspective view including a partial cross sectional view of the insert t-nut of the present invention, in which the periphery of the flange portion has a projected portion made of a synthesis resin which is extended in the direction from one end of the shank to the tip portion thereof.
Figure 37:
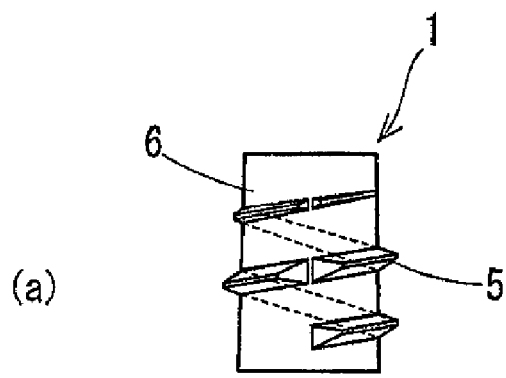
FIG. 37(a) and FIG. 37(b) show a plan view and a front view of the insert nut as another embodiment of the present invention.
Figure 38:
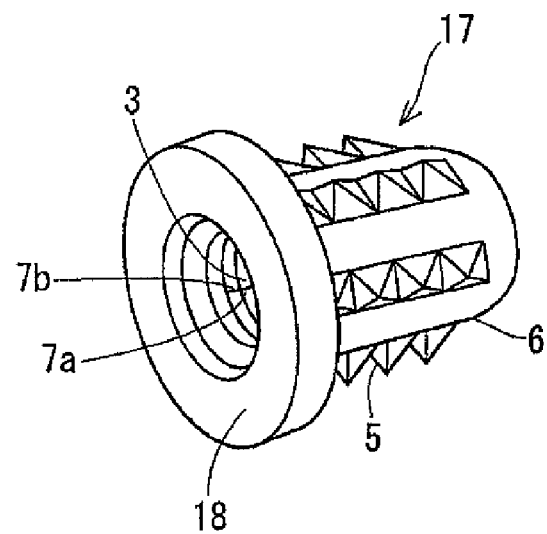
FIG. 38 shows a perspective view of the insert t-nut of another embodiment of the present invention.
Figure 39:
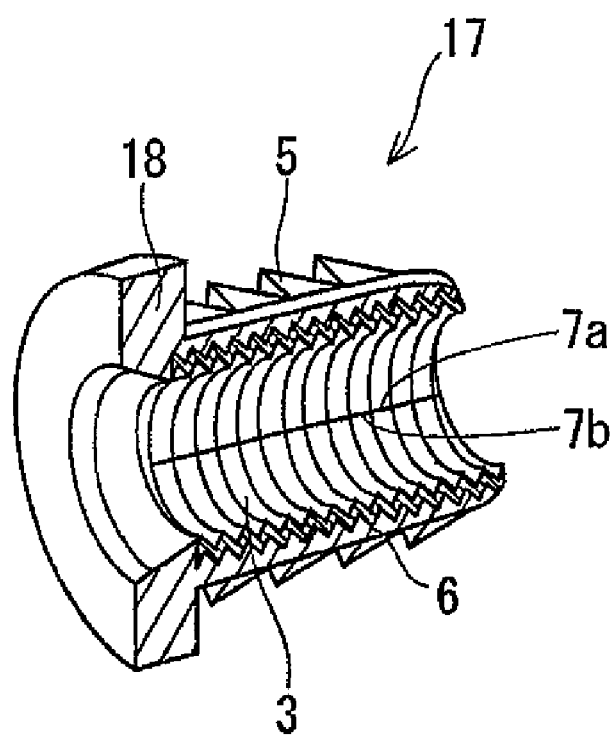
FIG. 39 shows a vertically cross sectional view of FIG. 38.

In the insert t-nut 17 of the present invention, the periphery of the flange portion 18, formed of a synthesis resin as shown in FIGS. 28 and 30, has projections 21 between a pair of the claws 20, toward the direction from one end of the shank 3 to the tip portion.

Figure 29:
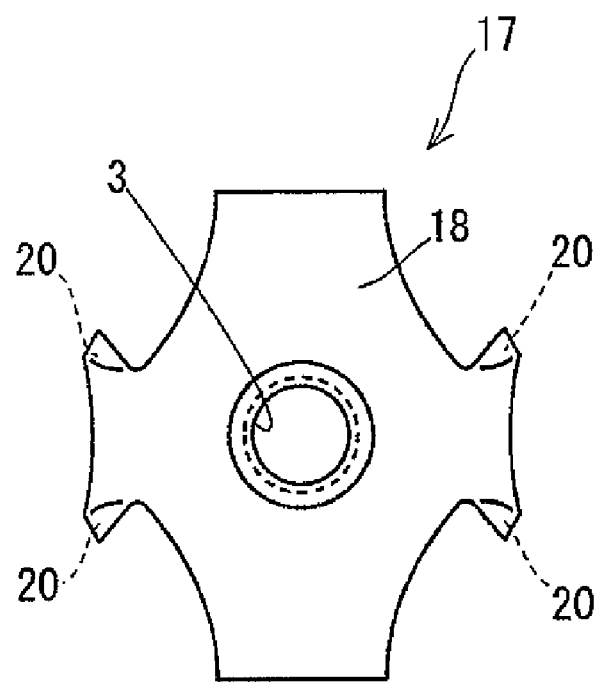
FIG. 29 shows a bottom view of the insert t-nut of the present invention, in which the flange portion is formed by a synthesis resin which is shaped into an octagonal or almost octagonal shape.

Also, the flange portion 18 is formed into an octagonal or almost octagonal shape as shown in FIG. 29.

Further, the insert t-nut 17 of the eighteenth embodiment of the present invention, as shown in FIG. 31(*a*), has a shank 3 having a to-be-caulked portion 22 at the tip portion, where the thickness is relatively small, and the inside surface of a cylindrical shape other than the to-be-caulked portion 22 has formed the female screw 2. The outside surface of the shank 3 other than the to-be-caulked portion 22 is covered with a resin layer 6. Further, a flange portion 18 is formed from a synthesis resin as being outwardly projected at the one end (lower end), and claws 20 are formed on the flange portion 18 integrally formed with the resin layer 6 in the direction from the one end (lower end) of the shank 3 to the tip portion thereof.

Also, in the insert t-nut 17 of the nineteenth embodiment of the present invention as shown in FIG. 31(*b*), it has the shank 3 and the to-be-caulked portion 22 as explained above, and the outside surface of the to-be-caulked portion is also covered with the resin layer 6. Further, a flange portion 18 is formed from a synthesis resin as being outwardly projected from the one end of the shank 3 to the tip portion thereof, and the claws 20 are formed on the flange portion 18 integrally formed with the resin layer 6 toward the direction from the one end of the shank 3 to the tip portion thereof.

Also, in the inset t-nut of the twentieth embodiment of the present invention as shown in FIG. 31(*c*), the shank 3 is formed from a metal plate 7 (7*c*, 7*d*), having the female screw 2. (In this case, the shank 3 does not have a to-be-caulked portion of the metal plate 7 (7*c*, 7*d*).) The outside surface of the shank 3 is covered with a resin layer 6 having projection at the outside surface, and a tube portion 23 as the to-be-caulked portion 22*a* is formed from the outside surface of the tip portion of the shank, which is integrally formed with the resin layer 6. Further, a flange portion 18 is formed of a synthesis resin as being outwardly projected from the one end of the shank 3 to the tip portion thereof and the claws 20 are formed on the flange portion 18 integrally formed with the resin layer 6 toward the direction from the one end of the shank 3 to the tip portion thereof.

FIGS. 32 to 37 show insert nuts of the present invention. While the shape and location of the projections are different from the insert nut as explained before, the other structures are the same as any of the insert nut as explained before. The same portions are numbered by the same numerals, omitting the detail description.

FIGS. 38 to 41 show insert t-nuts of other embodiments of the present invention, which basically have the same structure as any of the insert nuts as explained above. The same portions are numbered by the same numerals, omitting the detail description.

Figure 42:
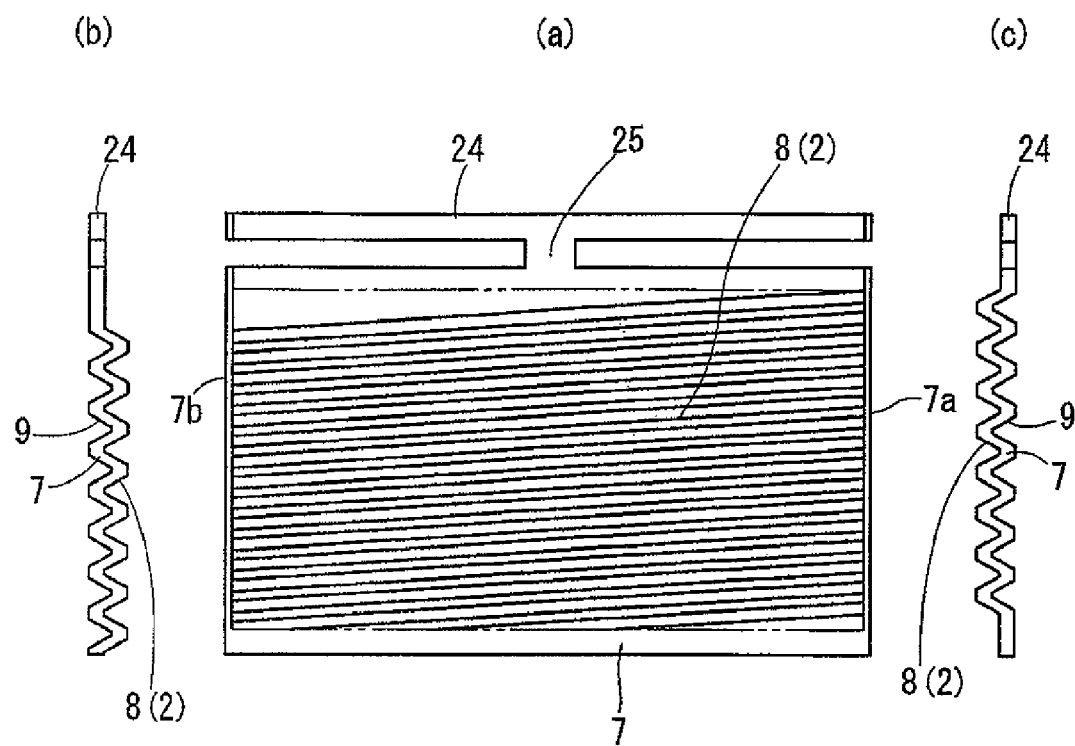
FIG. 42 show views of the insert t-nut of the twenty-first embodiment of the present invention.
Figure 43:
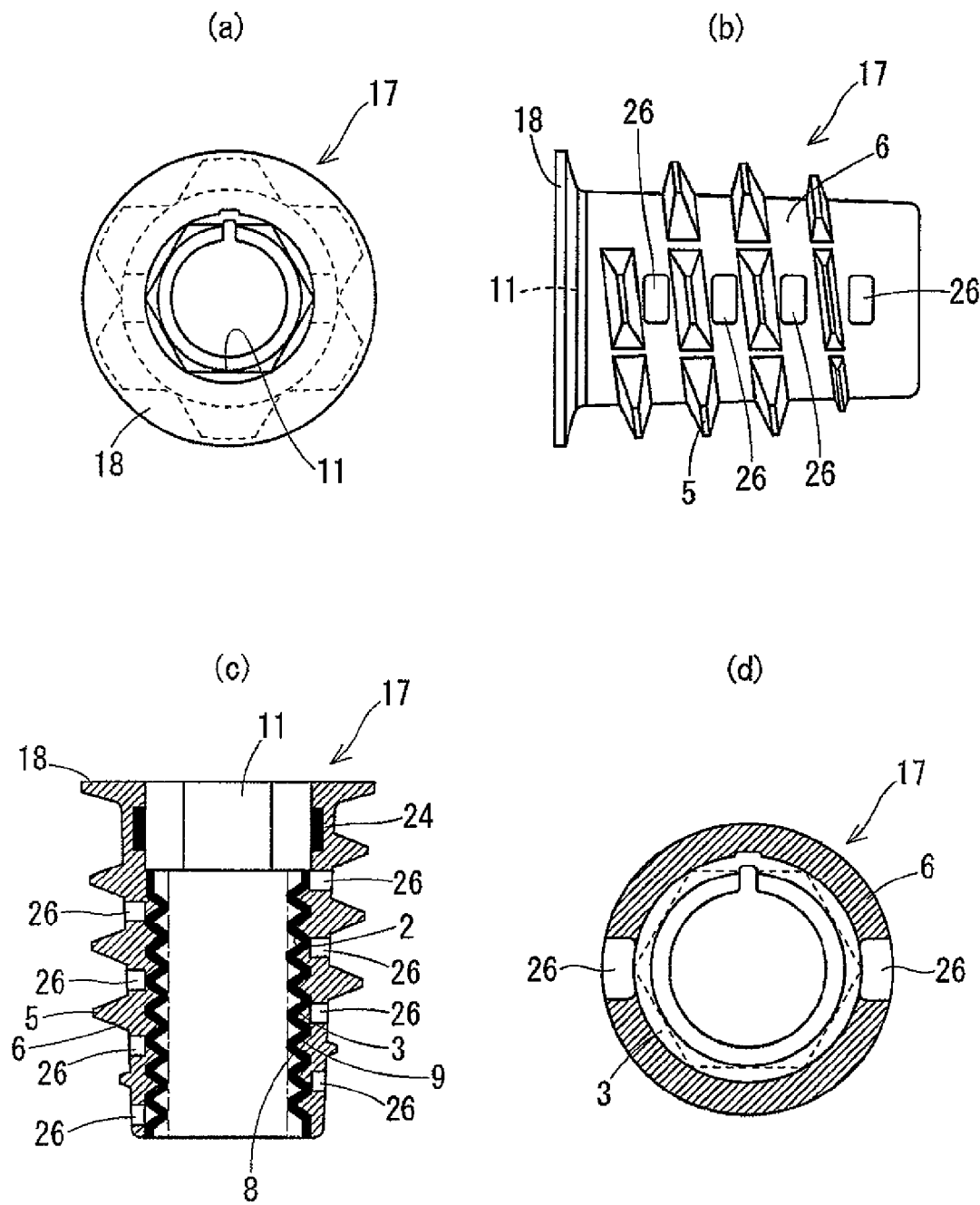
FIG. 43 show views of the insert t-nut of the twenty-first embodiment of the present invention.
Figure 47:
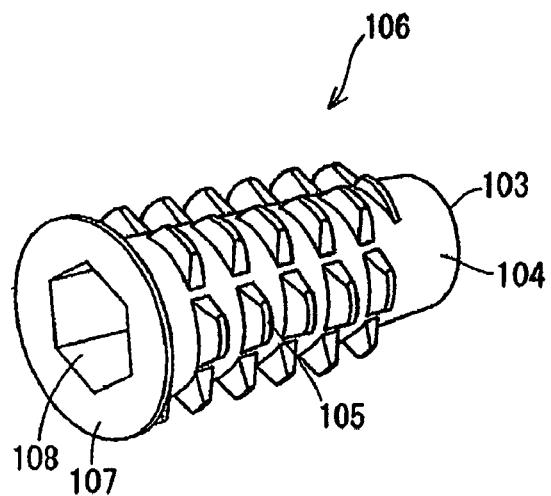
FIG. 47 shows a perspective view of another insert nut of the prior art.
Figure 48:
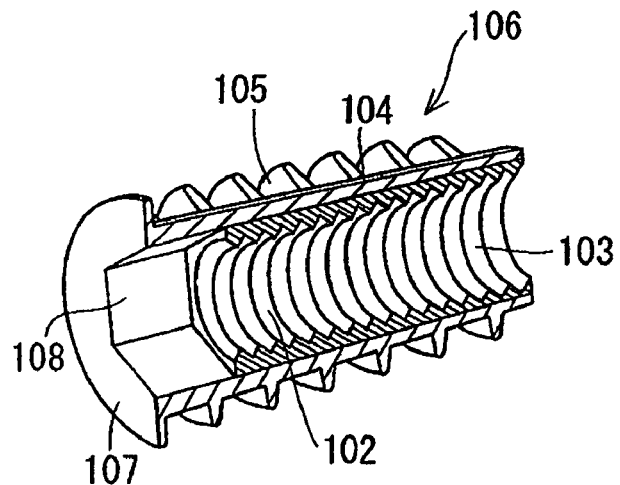
FIG. 48 shows a vertically cross sectional view of the example as shown in FIG. 47.
Figure 49:
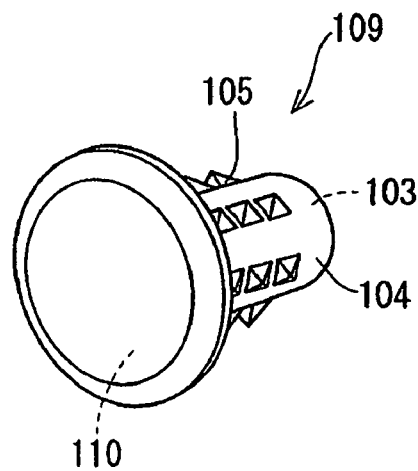
FIG. 49 shows a perspective view of an insert t-nut of the prior art.
Figure 50:
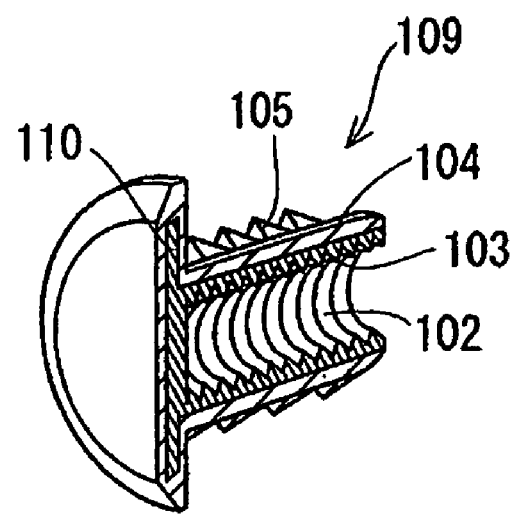
FIG. 50 shows a vertically cross sectional view of the example as shown in FIG. 49.

FIGS. 42 to 44 show insert t-nuts 17 of the twenty-first embodiment of the present invention, which is formed of a rectangular metal plate 7 provided with an auxiliary metal plate portion 24 through a connecting metal plate portion 25, and a synthesis resin.

That is, a screw portion 8 is formed by pressing a dies at one surface of the metal plate 7. By forming this screw portion 7, a pattern portion 9 is formed on the other surface of the metal plate 7. The metal plate 7 is cylindrically wound with the screw portion 9 to become a female screw 2 inside, and the auxiliary metal plate portion 24 is bent in a polygonal shape to form the polygonal portion 11. The auxiliary metal plate portion 24 can be cylindrically bent in the insert t-nut of this embodiment.

The opposite ends 7*a*, 7*b* of the metal plate 7 (or the opposite ends of the metal plate 7 and auxiliary metal plate portion 24, respectively) are connected to form a cylindrical shank 3.

A resin layer 6 of a synthesis resin, having projections outside, is formed to cover the exposed outside surfaces of the pattern portion 9 of the shank 3 and the auxiliary metal plate portion 24. At this time, the metal plate, which is cylindrically wound, has a declination of the opposite ends 7*a*, 7*b* of the metal plate 7, as shown in FIG. 44. With correcting this declination, the outside surface of the shank is covered with the resin layer 6. The metal plate 7, which is cylindrically wound, is held by a press pin (not shown) from the outside, so as to correct the declination of the opposite ends 7*a*, 7*b* of the metal plate generated during the process of the winding, avoiding the synthesis resin from entering from the gap of the connected portion 7*a*, 7*b* of the metal plate 7 during the forming process. Also, the metal plate 7 (shank 3) is held at a predetermined shape while correction of the declination at the connected portion. For these reasons, pin insert holes are formed on the resin layer 6 at the opposite radial portions of the shank, at a certain interval in the length direction of the shank 3. (In the drawing, they are formed between the projections.)

Further, at the side of the auxiliary metal plate 24 of the shank 3, a flange portion 18 is integrally formed with the resin layer 6 as projecting outwardly. As explained above, the insert t-nut of the twenty-first embodiment is formed.

It should be noted that the scope of the present invention include an embodiment same as the insert t-nut of the twenty-first embodiment except for missing the flange portion 18 of a synthesis resin, (that is, a structure of the twenty-first embodiment without the flange portion 18). Such an embodiment is omitted to show in the drawings.

Also, the insert t-nut of the present invention can have the shank 3 formed by several sheets of the metal plates, in the insert t-nut 17 of the twenty-first embodiment as well as in the insert t-nut 17 of the twenty-first embodiment without the flange portion 18. The opposite ends of the metal plate, which is connected after cylindrically winding, can be straight, patterned in a continuous or discontinuous manner, or curved in a continuous or discontinuous manner. Also, at least one concave portion is formed on the outside surface of the shank corresponding to the female screw, so as to partially disorder the screw head of the female screw. Also, the projections can be formed on the outside surface of the shank in the perpendicular direction and the radial direction at a certain interval. Alternatively, the projections can be formed in a continuous spiral manner or in a discontinuous spiral manner. Also, the shank 3 can have an outside diameter gradually reduced from the one end to the tip portion.

Also, in the insert t-nut of the twenty-first embodiment of the present invention, the periphery of the flange can have claws (for example, two pairs of claws) made of a synthesis resin, which are extended from one end of the shank to the tip portion thereof. The pairs of the claws can be opposed, parallel or almost parallel with respect to the radial direction of the flange portion. The periphery of the flange portion can have projections made of a synthesis resin from one end of the shank to the tip portion thereof. The flange portion can be shaped into an octagonal or almost octagonal form. The shank can have a comparatively thin portion at the tip portion, that is, a to-be-caulked portion, and a female screw can be formed on the inside surface corresponding to the portion without the to-be-caulked portion. The outside surface of the to-be-caulked portion can be also covered with the resin layer. The resin layer covering the outside surface of the shank can be further extended from the tip portion of the shank, which becomes a to-be-caulked portion of a synthesis resin integrally formed with the tube portion.

The numbers in the drawings are summarized. 1: insert nut; 2: female screw; 3: shank; 4: outside surface; 5: projections; 6: resin layer; 7: metal plate; 8: screw portion; 9: patterned portion; 11: polygonal portion; 12, 13: portion with a predetermined width; 14: concave portion; 15: screw head; 17: insert t-nut; 18: flange portion; 20: claws; 21: projected portion; 22: to-be-caulked portion; and 24: auxiliary metal plate portion.

What is claimed is:

1. An insert nut comprising;
    a shank formed by winding a metal plate having opposite edges to form a polygonal hollow portion and a cylindrical hollow portion, the polygonal hollow portion being formed at a first end of the shank, and the cylindrical hollow portion being formed at a second end of the shank;
    a female screw formed inside the cylindrical hollow portion;
    a pattern corresponding to the female screw formed outside the cylindrical hollow portion;
    a connection formed by connecting the opposite edges each other, the connection being formed on the polygonal hollow portion and the cylindrical hollow portion; and
    a resin layer formed outside the cylindrical hollow portion, wherein a press process is not applied to a first part of the metal plate to form the polygonal hollow portion, but applied to a second part of the metal plate to form the female screw, wherein the shank further comprises a bridge portion formed between the polygonal hollow portion and the cylindrical hollow portion to separate the polygonal hollow portion from the cylindrical hollow portion.

2. An insert nut according to claim 1, wherein the resin layer has projections formed outside.

3. An insert nut according to claim 1, wherein the shank is deformed at a portion corresponding to the female screw so as to disorder the female screw.

4. An insert nut according to claim 1, wherein the shank has an outside diameter which is gradually reduced from the second end to the first end.

5. An insert nut according to claim 1, wherein the shank further comprises a to-be-caulked portion extended from the cylindrical hollow portion at the second end thereof.

6. An insert nut according to claim 5, wherein the to-be-caulked portion is covered with the resin layer.

7. An insert nut according to claim 1, further comprising a flange outwardly extended from the first end of the shank, the flange being integrally made of the resin layer.

8. An t-insert nut according to claim 1, further comprising;
    a flange outwardly extended from the first end of the shank, the flange being integrally made of the resin layer.

* * * * *